(12) United States Patent
Zhang et al.

(10) Patent No.: US 11,384,866 B2
(45) Date of Patent: Jul. 12, 2022

(54) PIPE CLAMP

(71) Applicant: Oatey Co., Cleveland, OH (US)

(72) Inventors: Kai Zhang, Cleveland, OH (US); John Jindra, Elyria, OH (US); Shawn Heipp, Strongsville, OH (US)

(73) Assignee: OATEY CO., Cleveland, OH (US)

( * ) Notice: Subject to any disclaimer, the term of this patent is extended or adjusted under 35 U.S.C. 154(b) by 0 days.

(21) Appl. No.: 16/744,740

(22) Filed: Jan. 16, 2020

(65) Prior Publication Data

US 2020/0232581 A1 Jul. 23, 2020

Related U.S. Application Data

(60) Provisional application No. 62/795,210, filed on Jan. 22, 2019.

(51) Int. Cl.
*F16L 3/10* (2006.01)
*F16L 3/12* (2006.01)

(52) U.S. Cl.
CPC ........... *F16L 3/1075* (2013.01); *F16L 3/1222* (2013.01); *F16L 3/1058* (2013.01)

(58) Field of Classification Search
CPC ..... F16L 3/1058; F16L 3/1075; F16L 3/1222; F16L 3/02; F16L 3/08; F16L 3/10; H02G 3/30; H02B 3/32
USPC .................................................. 248/74.1, 71
See application file for complete search history.

(56) References Cited

U.S. PATENT DOCUMENTS

| 1,476,834 | A | | 12/1923 | Pleister | |
|---|---|---|---|---|---|
| 2,447,251 | A | | 8/1948 | Huette | |
| 3,199,816 | A | * | 8/1965 | Weisz | F16L 3/1236 248/71 |
| 3,749,819 | A | * | 7/1973 | Wilson | H01B 17/145 174/166 R |
| 4,260,123 | A | * | 4/1981 | Ismert | F16L 3/12 174/166 R |
| 4,442,994 | A | * | 4/1984 | Logsdon | F16L 3/1075 248/74.3 |
| 4,582,288 | A | | 4/1986 | Ruehl | |
| 4,903,921 | A | * | 2/1990 | Logsdon | F16L 3/04 248/74.1 |
| 5,054,741 | A | * | 10/1991 | Ismert | F16L 3/04 248/74.5 |
| 5,739,474 | A | * | 4/1998 | Bradley | H02G 3/26 248/74.2 |
| 5,897,082 | A | | 4/1999 | Losada | |

(Continued)

*Primary Examiner* — Christopher Garft
(74) *Attorney, Agent, or Firm* — BakerHostetler

(57) ABSTRACT

The disclosure is directed to a pipe clamp configured to support a pipe from a mounting surface. The pipe clamp includes a mounting post, arm, and hinge. The mounting post has a first post end and a second post end that includes a first coupling element. The mounting post defines a first recess. The arm has a first arm end and a second arm end that includes a second coupling element configured to couple to the first coupling element. The arm defines a second recess. The hinge is positioned between the mounting post and the arm and is connected to the first post end of the mounting post and to the first arm end of the arm. The mounting post and arm are rotatable about the hinge from an open position to a closed position. In the closed position the first coupling element is coupled to the second coupling element.

3 Claims, 42 Drawing Sheets

(56) References Cited

U.S. PATENT DOCUMENTS

| | | | |
|---|---|---|---|
| 6,073,891 A * | 6/2000 | Humber | F16L 3/13 |
| | | | 248/74.5 |
| 6,666,415 B2 | 12/2003 | Hansen | |
| 7,207,530 B2 * | 4/2007 | Ismert | F16L 3/13 |
| | | | 248/74.2 |
| 7,658,351 B2 | 2/2010 | Hansen | |
| 7,896,296 B2 | 3/2011 | Julian et al. | |
| 8,231,147 B2 * | 7/2012 | Link | F16L 33/035 |
| | | | 285/420 |
| 8,882,059 B2 * | 11/2014 | Schmidt | F16L 3/1041 |
| | | | 248/65 |
| 9,458,951 B2 | 10/2016 | Haynes et al. | |

* cited by examiner

700

PIPE CLAMP

CROSS-REFERENCE TO RELATED APPLICATIONS

This application claims the benefit of U.S. Provisional Application No. 62/795,210, filed Jan. 22, 2019, the disclosure of which is incorporated by reference herein in its entirety.

TECHNICAL FIELD

This disclosure relates generally to a pipe clamp for supporting different sized conduits (including tubing and pipes) and for attaching the conduits to a mounting structure.

BACKGROUND

Plumbing pipes are supported to mounting structures using generally two types of pipe clamps: Half clamps and full clamps. Half clamps include a general "L"-shaped body which surrounds only a portion of the tube in order to secure it. Full clamps surround most (if not all) of the diameter of the tube body. There are generally two types of full clamps: Open loop "C" style and closed loop. Open loop "C" style clamps include a "C"-shaped body with two arms extending from a back portion. The back portion includes a nail receiving channel. A nail is inserted through the channel and driven into the mounting structure to secure the clamp to the mounting structure. A conduit is supported between the two arms.

Closed loop clamps include arms that completely encompass and wrap around the pipe. The ends of the arms abut against each other forming the nail receiving channel. A nail is inserted through the channel securing the two ends of the arms together, and driven into the mounting structure to secure the clamp to the mounting structure.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein.

SUMMARY

There are times when it is necessary to remove a pipe clamp after it has been installed onto a mounting structure. For example, the pipe clamp may be removed to remove the pipe, relocate the pipe, reposition the pipe clamp, or for other reasons. Conventional pipe clamps are often difficult to remove. Generally, the pipe clamps are secured to the mounting surface using a ring-shanked type nail. Once the head of the nail is fully inserted into the nail receiving channel, it is difficult to remove since the head of the nail is driven against a surface of the pipe clamp. The pipe clamps are removed by forcing a claw of a hammer, a prybar, certain pliers, or other prying tool between the mounting structure and an area of the clamp that is in direct contact with the mounting structure. The area on the pipe clamp where the nail exits the mounting structure is the preferred region of where to pry. Removing the pipe clamp from the mounting structure commonly results in claw marks and/or marring from the hammer, and can result in damage to the body of the pipe clamp. Another method for removing the pipe clamp includes grabbing the body of the clamp with pliers to pull it out, which may also result in damage to the body of the pipe clamp.

Full clamps are fastened to a mounting structure by inserting a nail thru both insertion holes at each end of the clamp. In closed loop full pipe clamps, this requires the clamp to be pressed and held together to maintain alignment of the nail insertion holes. Closed loop full clamps make it difficult to drive nails through the nail insertion holes because the clamp may only be released after the nail is driven through the nail insertion holes, which holds each end of the clamp together.

Therefore, there is a need for a pipe clamp capable of being removed from a mounting structure without causing damage to either the mounting structure or the pipe clamp, and maintaining adequate alignment of the nail receiving channels prior to inserting the nail during installation. The foregoing needs are met, to a great extent, by the pipe clamp disclosed in the present application.

An aspect of the present disclosure provides a pipe clamp that comprises a mounting post, an arm, and a hinge positioned between the mounting post and the arm. The mounting post has a first post end and a second post end spaced apart from the first post end. The mounting post defines a first arcuate recess that extends at least partially between the first post end and the second post end. The second post end includes a first coupling element. The arm has a first arm end and a second arm end spaced apart from the first arm end. The arm defines a second arcuate recess that extends at least partially between the first post end and the second post end. The second arm end includes a second coupling element configured to couple to the first coupling element. The hinge is connected to the first post end of the mounting post and to the first arm end of the arm. The mounting post is rotatable relative to the arm about the hinge from an open position to a closed position. In the closed position the first coupling element is coupled to the second coupling element.

Another aspect of the present disclosure provides a pipe clamp that comprises a first arm, a second arm, and a hinge positioned between the first arm and the second arm. The first arm has a mounting end and an insertion end spaced apart from the mounting end. The first arm defines a first arcuate recess that extends at least partially between the mounting end and the insertion end. The first arm includes a first extension element. The second arm has a mounting end and an insertion end spaced apart from the mounting end. The second arm defines a second arcuate recess that extends at least partially between the mounting end and the insertion end. The second arm includes a second extension element. The hinge is connected to the mounting end of the first arm and to the mounting end of the second arm. The first arm is rotatable relative to the second arm about the hinge. The first arcuate recess and the second arcuate recess comprise a pipe recess configured to support a pipe within. The hinge, the first extension element, and the second extension element define a flex recess therebetween.

This Summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there are shown in the drawings illustrative embodiments of the disclosure. It should be understood, however, that the application is not limited to the precise arrangements and instrumentalities shown. In the drawings.

DETAILED DESCRIPTION

Figure 1:
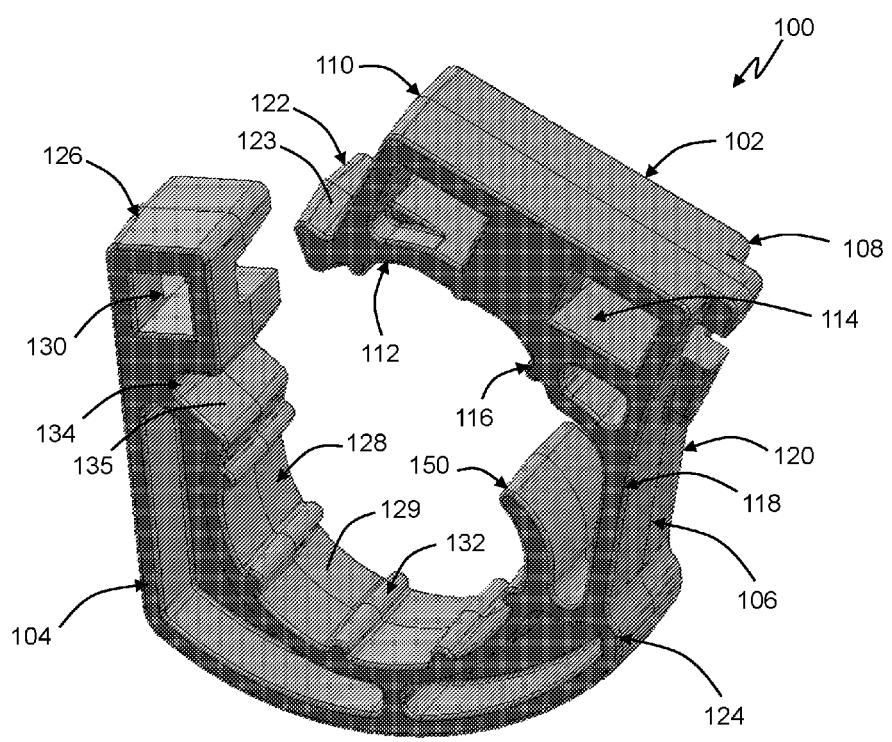
FIG. 1 illustrates a top perspective view of a pipe clamp in an open position, according to a first aspect of this disclosure.

Pipe clamps for supporting a pipe from a mounting surface are disclosed. A first pipe clamp (e.g. closed loop full pipe clamp) includes a mounting post, an arm, and a hinge positioned between the mounting post and the arm. The mounting post and the arm both include a coupling element configured to couple the mounting post to the arm. The mounting post is rotatable relative to the arm about the hinge from an open position to a closed position. In the closed position, the coupling elements of the mounting post and the arm are coupled together. The mounting post and the arm define a pipe recess within for supporting the pipe.

A second pipe clamp (e.g. open loop "C"-style pipe clamp) includes a first arm, a second arm, and a hinge positioned between the first arm and the second arm. Each of the first and second arms define an arcuate recess and include an extension element that extend from each arm toward the opposing arm. The extension elements and the hinge define a flex recess. The size and shape of the flex recess allow the first and second arms to rotate relative to one another about the hinge to receive the pipe within the arcuate recesses.

Certain terminology used in this description is for convenience only and is not limiting. The words "top", "bottom", "above", "below", "axial", "transverse", "circumferential," and "radial" designate directions in the drawings to which reference is made. The term "substantially" is intended to mean considerable in extent or largely but not necessarily wholly that which is specified. All ranges disclosed herein are inclusive of the recited endpoint and independently combinable (for example, the range of "from 2 grams to 10 grams" is inclusive of the endpoints, 2 grams and 10 grams, and all the intermediate values). The terminology includes the above-listed words, derivatives thereof and words of similar import.

FIG. 1 illustrates a top perspective view of a full pipe clamp 100 in an open position, according to an aspect of this disclosure. The pipe clamp 100 is configured to support conduits or pipes including, for example, PEX, CPVC, and copper pipes, from a mounting structure such as a wall stud, floor, ceiling joist, or still other mounting structures. The pipe clamp 100 may be molded out of a plastic, such as, for example, polyethylene, polypropylene, acrylonitrile butadiene styrene (ABS), other thermoplastic polymers, or still other plastics.

The pipe clamp 100 includes a mounting post 102, an arm 104, and a hinge 106 (e.g. a flex hinge) positioned between the mounting post 102 and the arm 104. The mounting post 102 has a first post end 108 and a second post end 110 spaced apart from the first post end 108. The mounting post 102 defines an arcuate recess 112, and further defines a first channel 114. The arcuate recess 112 is defined by an inner surface of the mounting post 102 and extends at least partially from the first post end 108 to the second post end 110. The inner surface of the mounting post 102 may include one or more axially extending ribs 116 spaced circumferentially about the inner surface. The ribs 116 extend from a front end 118 of the clamp 100 to a back end 120 of the clamp 100.

The mounting post 102 includes a first coupling element 122 positioned at the second post end 110. The coupling element 122 may include a protrusion 123 (e.g. latch) that extends from the second post end 110. An inner surface of the coupling element 122 may form a portion of the arcuate recess 112.

The arm 104 has a first arm end 124 and a second arm end 126 spaced apart from the first arm end 124. The arm 104 defines an arcuate recess 128, and further defines a second channel 130 that extends through the second arm end 126. The arcuate recess 128 is defined by an inner surface 129 of the arm 104 and extends at least partially from the first arm end 124 to the second arm end 126. The inner surface 129 of the arm 104 may include one or more axially extending ribs 132 spaced circumferentially about the inner surface 129 and extending from the front end 118 to the back end 120 of the clamp 100.

The arm 104 includes a second coupling element 134 positioned at or adjacent to the second arm end 126. The second coupling element 134 may include a notch 135 that is recessed within the arm 104. The notch 135 is configured to receive the latch 123 of the mounting post 102 within to removably secure the second arm end 126 of the arm 104 to the second post end 110 of the mounting post 102 (e.g. notch-latch coupling system).

The hinge 106 is connected to the first post end 108 of the mounting post 102 and the first arm end 124 of the arm 104. The mounting post 102 is rotatable relative to the arm 104 about the hinge 106 from an open position to a closed position. In the closed position, the latch 123 of the mounting post 102 is secured within the notch 135 of the arm 104, removably securing the mounting post 102 to the arm 104.

Figure 2A:
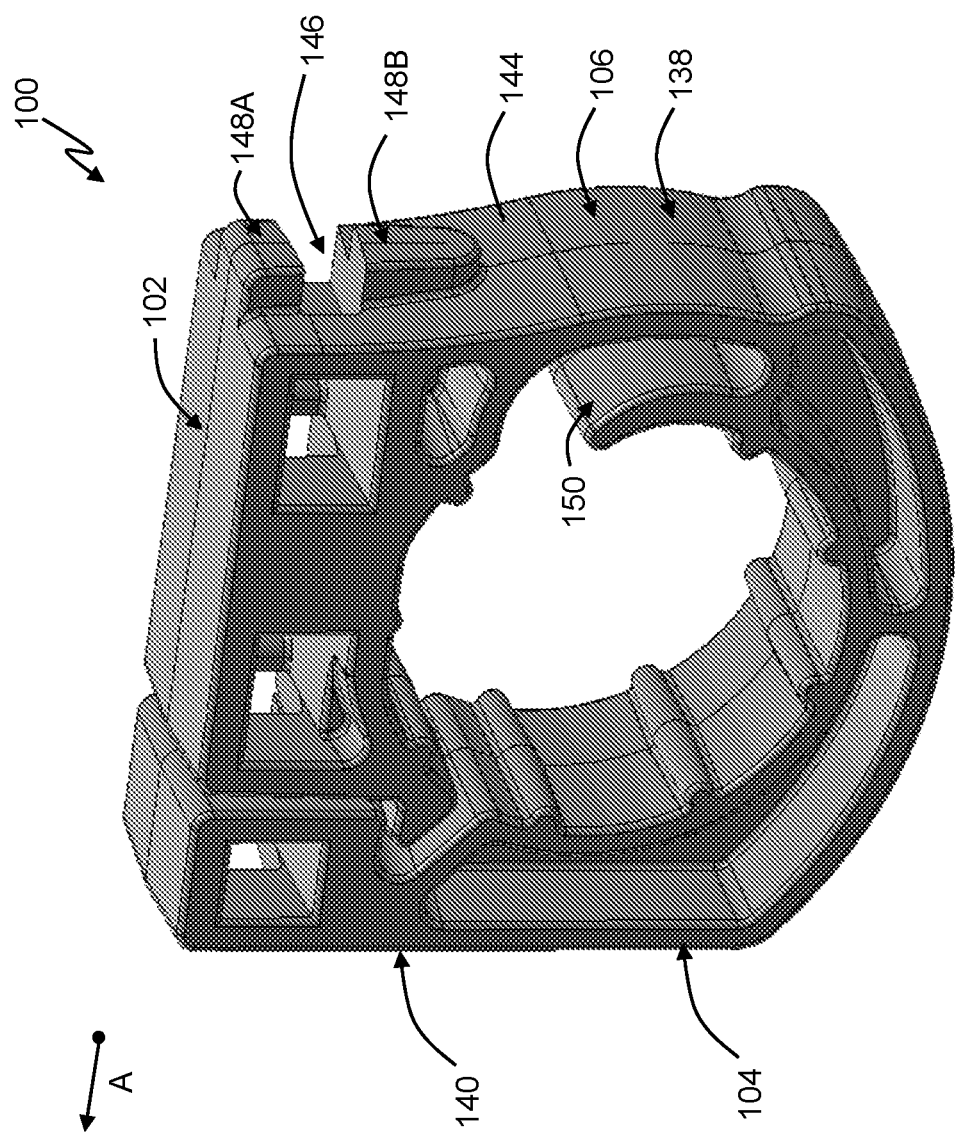
FIGS. 2A and 2B illustrate top perspective views of the pipe clamp shown in FIG. 1 in a closed position, according to an aspects of this disclosure.
Figure 2B:
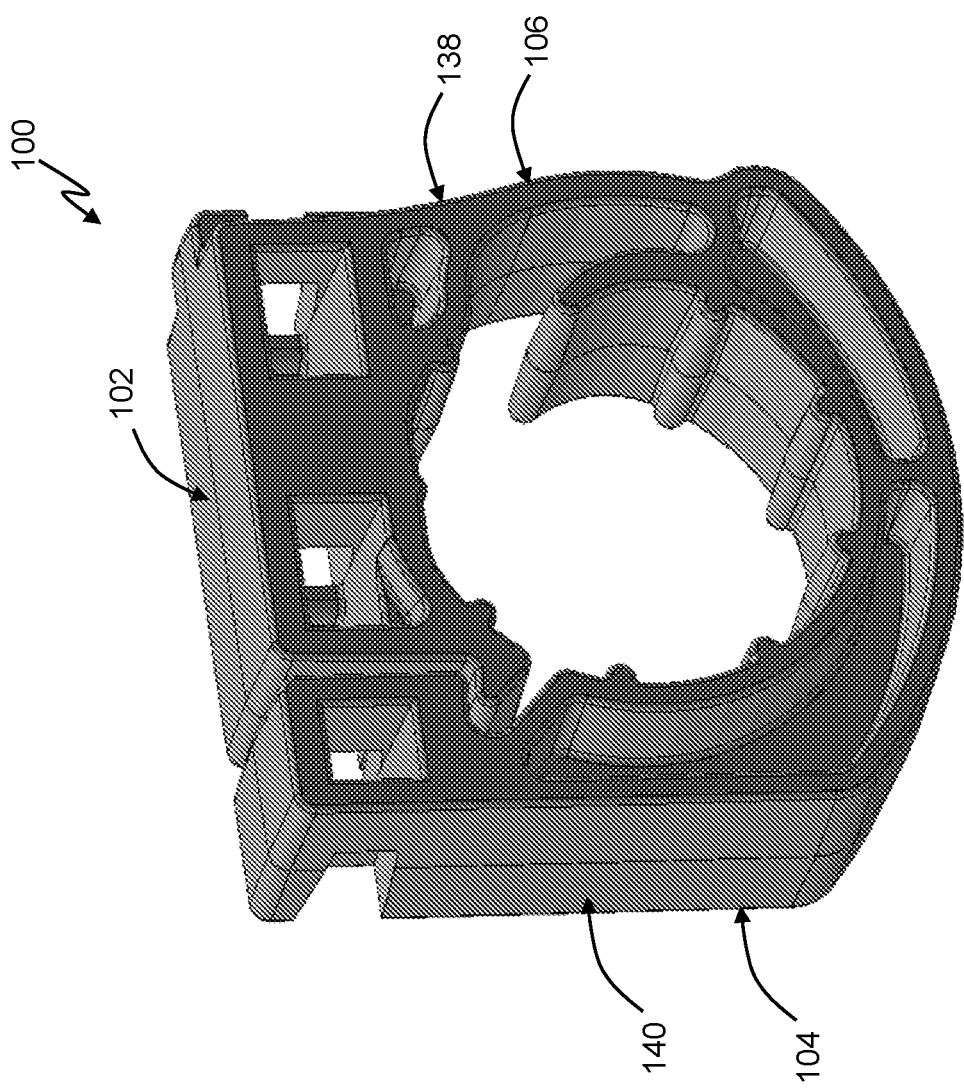
Figure 3A:
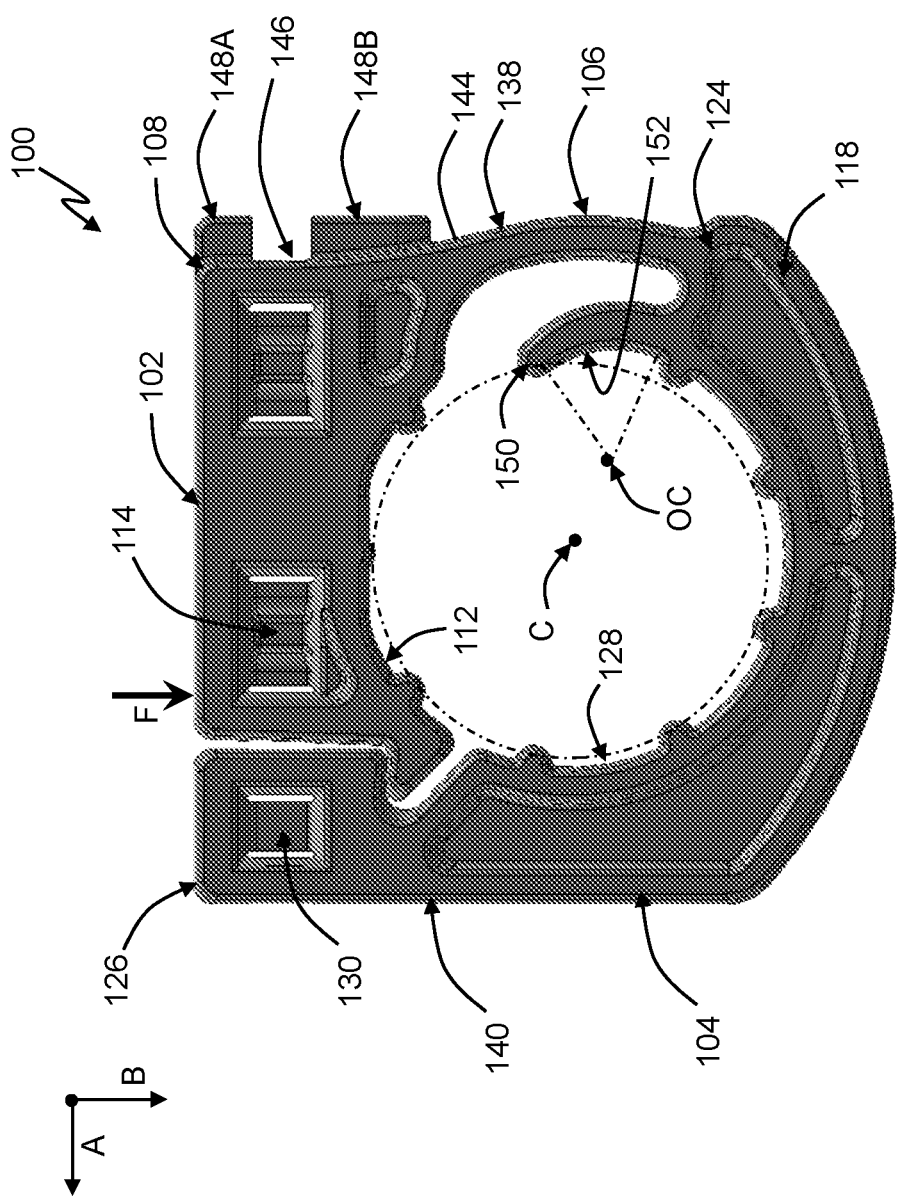
FIGS. 3A and 3B illustrate a front view and a back view of the pipe clamp shown in FIG. 1 in a closed position, according to aspects of this disclosure.
Figure 3B:
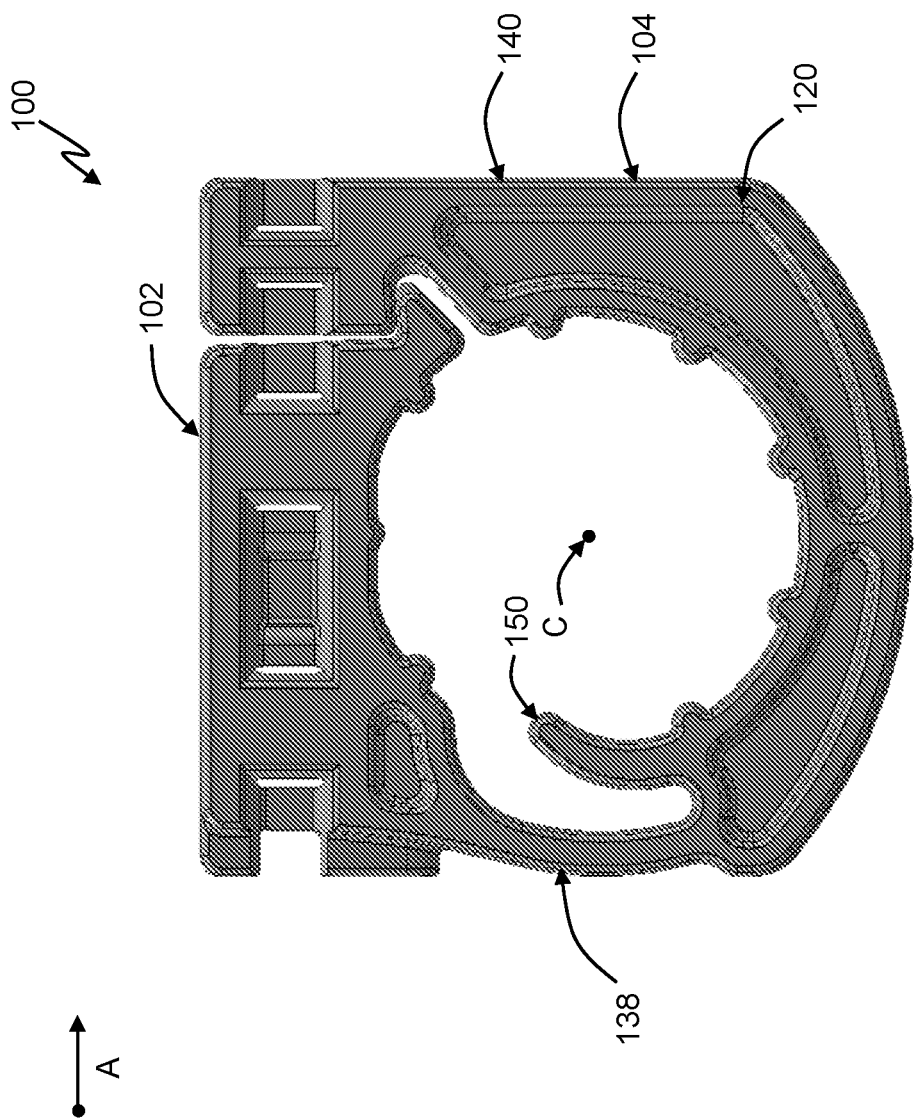
Figure 4B:
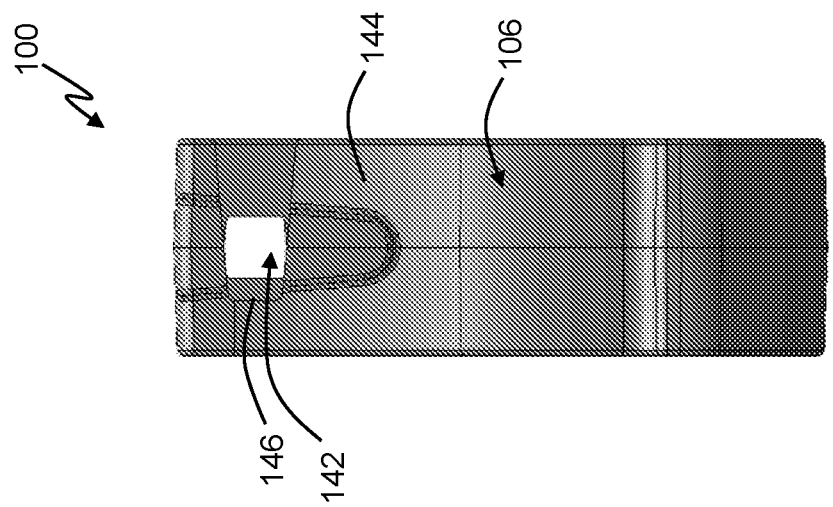
FIGS. 4A and 4B illustrate a first side view and a second side view of the pipe clamp shown in FIG. 1 in the closed position, according to aspects of this disclosure.
Figure 4A:
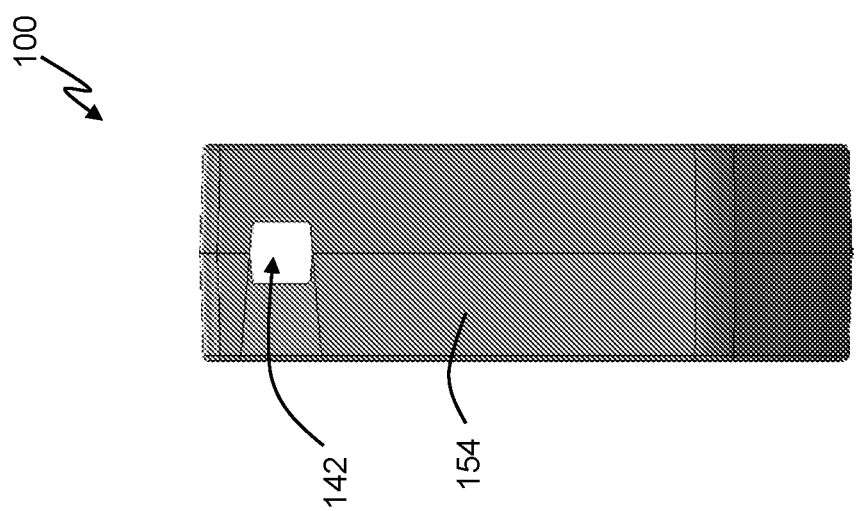

FIGS. 2A and 2B illustrate perspective views of the pipe clamp 100 in a closed position, FIGS. 3A and 3B illustrate a front view and a back view of the pipe clamp 100 in the closed position, respectively, and FIGS. 4A and 4B illustrate a first side view and a second side view of the pipe clamp 100 in the closed position, respectively, according to aspects of this disclosure. The pipe clamp 100 has an insertion end 138 and a mounting end 140 spaced apart from the insertion end 138 in an insertion direction A. When the mounting arm 104 is in the closed position, the pipe clamp 100 defines a mounting channel 142 that extends through the pipe clamp 100 in the insertion direction A from the insertion end 138 to the mounting end 140. The mounting channel 142 comprises the channel 114 defined by the mounting post 102 and the channel 130 defined by the arm 104, and is configured to receive a fastener (e.g. nail, screw, bolt, or other similar type of fastener) therethrough from the insertion end 138 to the mounting end 140.

The mounting post 102 has an outer surface 144 that extends along at least a portion of the insertion end 138 of the pipe clamp 100. The outer surface 144 defines an opening 146 to the mounting channel 142. The mounting post 102 includes a relief protrusion 148A,B that extends from the outer surface 144 in a direction opposite the insertion direction A. The relief protrusion 148A,B is positioned in close proximity to the opening 146. In an aspect, the relief protrusion 148A,B is substantially adjacent to the opening 146. The relief protrusion 148A,B enables a prying tool to access a head of the fastener positioned within the mounting channel 142 to facilitate removal of the fastener from the pipe clamp 100.

The hinge 106 is positioned at the insertion end 138 of the pipe clamp 100. The outer surface 144 extends along the insertion end 138 of the pipe clamp 100 from the opening 146 of the mounting channel 142 to the hinge 106. The outer surface 144 may be curved such that the outer surface 144 at the opening 146 is spaced from the outer surface 144 at the hinge 106 along the insertion direction A. The curvature of the outer surface 144 forms a prying support (e.g. hammer support) for supporting the prying tool during removal of the fastener positioned within the mounting channel 142.

The arm 104 includes an extension element 150 that extends from the first arm end 124. With reference to FIG. 3A, the extension element 150 is positioned adjacent to and radially inward from the hinge 106. An inner surface of the extension element 150 defines an arcuate recess 152.

The arcuate recess 128 defined by the arm extends in a substantially circumferential direction about a center C of the pipe clamp 100. The arcuate recess 112 defined by the mounting post 102 also extends about the center C in the substantially circumferential direction when the mounting post 102 is in the closed position. The arcuate recess 152 of the extension element 150 extends in a substantially circumferential direction about an off-center OC location, which is off-set from the center C of the pipe clamp 100. Each of the arcuate recesses 112, 128, and 152 comprise a pipe recess configured to receive a pipe within the clamp 100. The center C is positioned on a pipe support axis that extends through the pipe clamp 100 from the front end 118 to the back end 120. The pipe support axis is substantially perpendicular to the insertion direction A and is positioned to align with a pipe axis of a pipe received within the pipe recess.

The mounting post 102 and the arm 104 may be integrally formed with the hinge 106 such that the mounting post 102, the arm 104, and the hinge 106 form a single unitary member. The hinge 106 may comprise a flexible hinge. Alternatively, the mounting post 102 and the arm 104 may be separate components manufactured independently of one another and coupled together by the hinge 106. In this alternative, the hinge 106 may comprise, for example, a type of pivot hinge.

Figure 5:
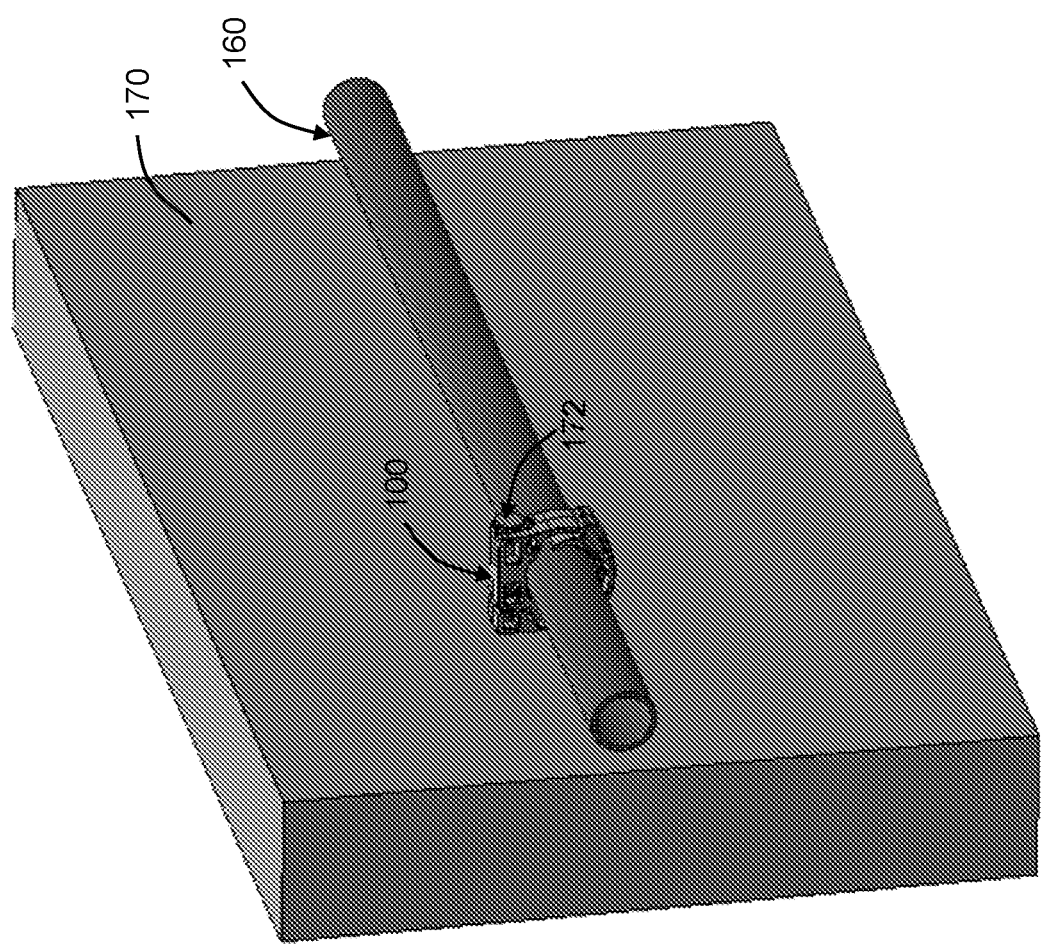
FIG. 5 illustrates a perspective view of the pipe clamp shown in FIG. 1 supporting a pipe from a mounting surface, according to an aspect of this disclosure.

FIG. 5 illustrates a perspective view of the pipe clamp 100 supporting a pipe 160 from a mounting surface 170, according to an aspect of this disclosure. One example of a method for supporting the pipe 160 from the mounting surface 170 commences by inserting the pipe 160 into the pipe recess of the pipe clamp 100 when the mounting post 102 is in the open position. The pipe 160 is held within the pipe recess by the inner surface of the arm 104 and the inner surface of the extension element 150. In an aspect, the extension element 150 may be flexible such that the extension element 150 flexes radially outward during insertion of the pipe 160. After the pipe 160 is inserted, the extension arm 150 flexes radially inward to support the pipe 160, and the off-center location OC, about which the arcuate recess 152 extends, may be transitioned to substantially align with the center C of the pipe recess.

After the pipe 160 is inserted into the pipe recess, the arcuate recess 128 of the arm 104 and the arcuate recess 152 of the extension element 150 extend about an outer surface of the pipe 160 at an arc angle of greater than 180°. In an aspect, the arcuate recess 128 of the arm 104 extends about the center C of the pipe clamp 100 at an arc angle of approximately 180°. When the pipe 160 is received within the pipe recess and the mounting arm 102 is in the open position, the inner surface of the arm 104 and the inner surface of the extension element 152 provide a force to the outer surface of the pipe 160 to hold the pipe 160 within the pipe recess. When the mounting arm 102 is transitioned to the closed position, the force applied to the outer surface of the pipe 160 by the arm 104 and the extension element 150 is increased.

After the pipe 160 is inserted into the pipe recess, the mounting post 102 is transitioned to the closed position by rotating the mounting post 102 relative to the arm 104 about the hinge 106. In the closed position, the latch 123 is positioned within the notch 135, securing the second post end 110 of the mounting post 102 to the second arm end 126 of the arm 104. The connection between the latch 123 and the notch 135 aligns the channel 114 defined by the mounting post 102 and the channel 130 defined by the arm 104, forming the linear mounting channel 142. The mounting post 102 may be transitioned to the closed position by applying a force F (see FIG. 3A) to the mounting post 102 in a transverse direction B. The transverse direction B is substantially perpendicular to the insertion direction A and to the pipe support axis. The force F may be applied to the second end 110 of the mounting post 102.

When the pipe 160 is secured within the pipe recess, an outer surface of the pipe 160 contacts the ribs 116 and 132 of the mounting post 102 and the arm 104, respectively. The outer surface of the pipe 160 also contacts a distal end of the extension element 150. The ribs 116 and 132 and the distal end of the extension element 150 provide diametrical support to the pipe 160. The arcuate recesses 112, 128, and 152 of the mounting post 102, the arm 104, and the extension element 150 provide clearance for thermal expansion of the pipe 160.

After the pipe 160 is secured within the pipe recess with the mounting post 102 in the closed position, the pipe clamp 100 is mounted to the mounting surface 170. The pipe clamp 100 may be aligned with the mounting surface 170 such that a mounting surface 154 of the arm 104 lies flush against the mounting surface 170 at a location where the pipe 160 is to be supported. A fastener 172 is inserted into the opening 146, through the mounting channel 142, and through the mounting surface 170, thereby securing the pipe clamp 100 to the mounting surface 170.

Figure 6B:
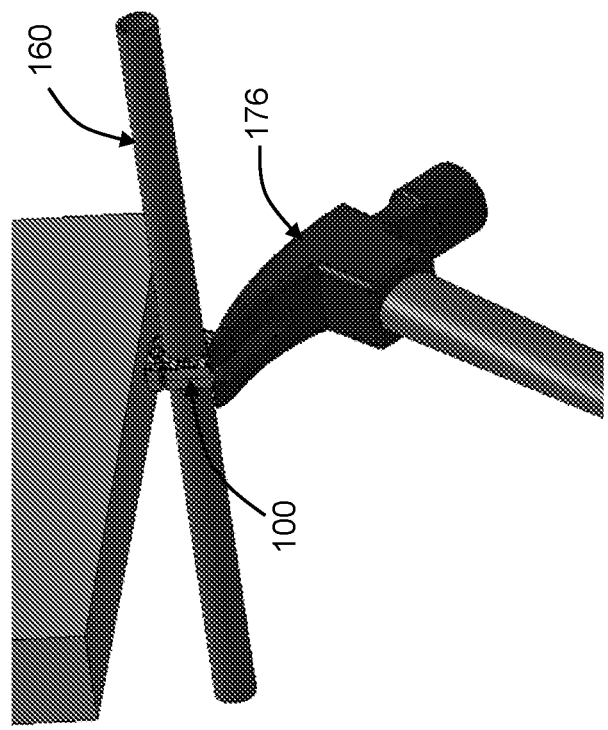
FIGS. 6A and 6B illustrate perspective views of the pipe clamp showing in FIG. 1 supporting a pipe from the mounting surface, and a prying tool, according to aspects of this disclosure.
Figure 6A:
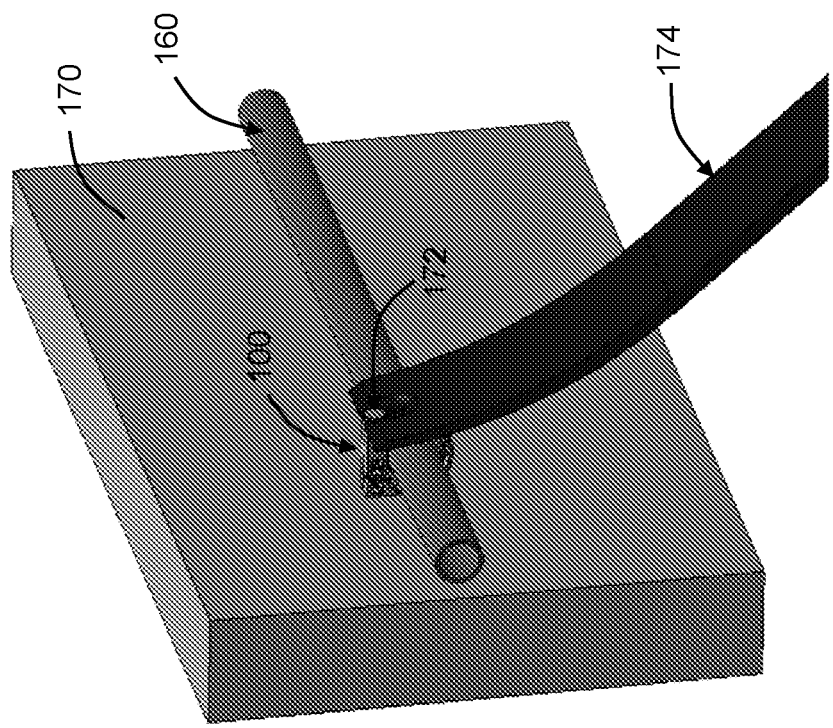

FIGS. 6A and 6B illustrate perspective views of the pipe clamp 100 supporting the pipe 160 from the mounting surface 170. One example of a method for removing the pipe clamp 100 from the mounting surface 170 commences by positioning an end of a prying tool 174 (FIG. 6A), or alternatively an end of a hammer 176 (FIG. 6B), at a location adjacent to the relief protrusion 148A,B and adjacent to a head of the fastener 172. In an aspect, the prying tool 174 may include two claws that are positioned about the relief protrusion 148A,B. The prying tool 174 is rotated in a lever-like manner pulling the fastener 172 out of the mounting surface 170 in a direction opposite the insertion direction A. The curved outer surface 144 and the first arm end 124 of the pipe clamp 100 form a prying support at the hinge 106 such that the prying tool 174 rotates about the contact between the prying tool 174 and the prying support.

Figure 7:
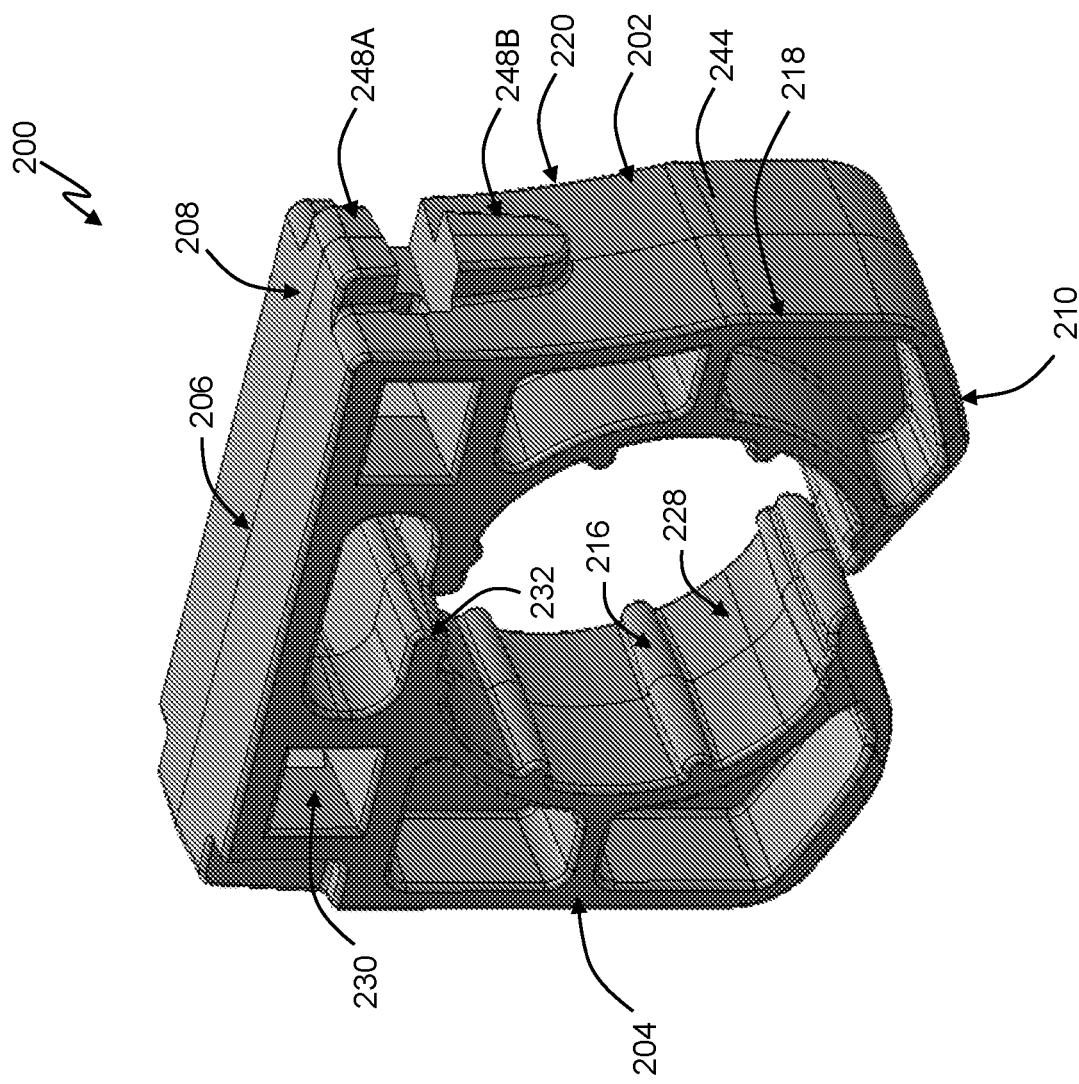
FIGS. 7 and 8 illustrate top perspective views of a second aspect of a pipe clamp, according to aspects of this disclosure.
Figure 8:
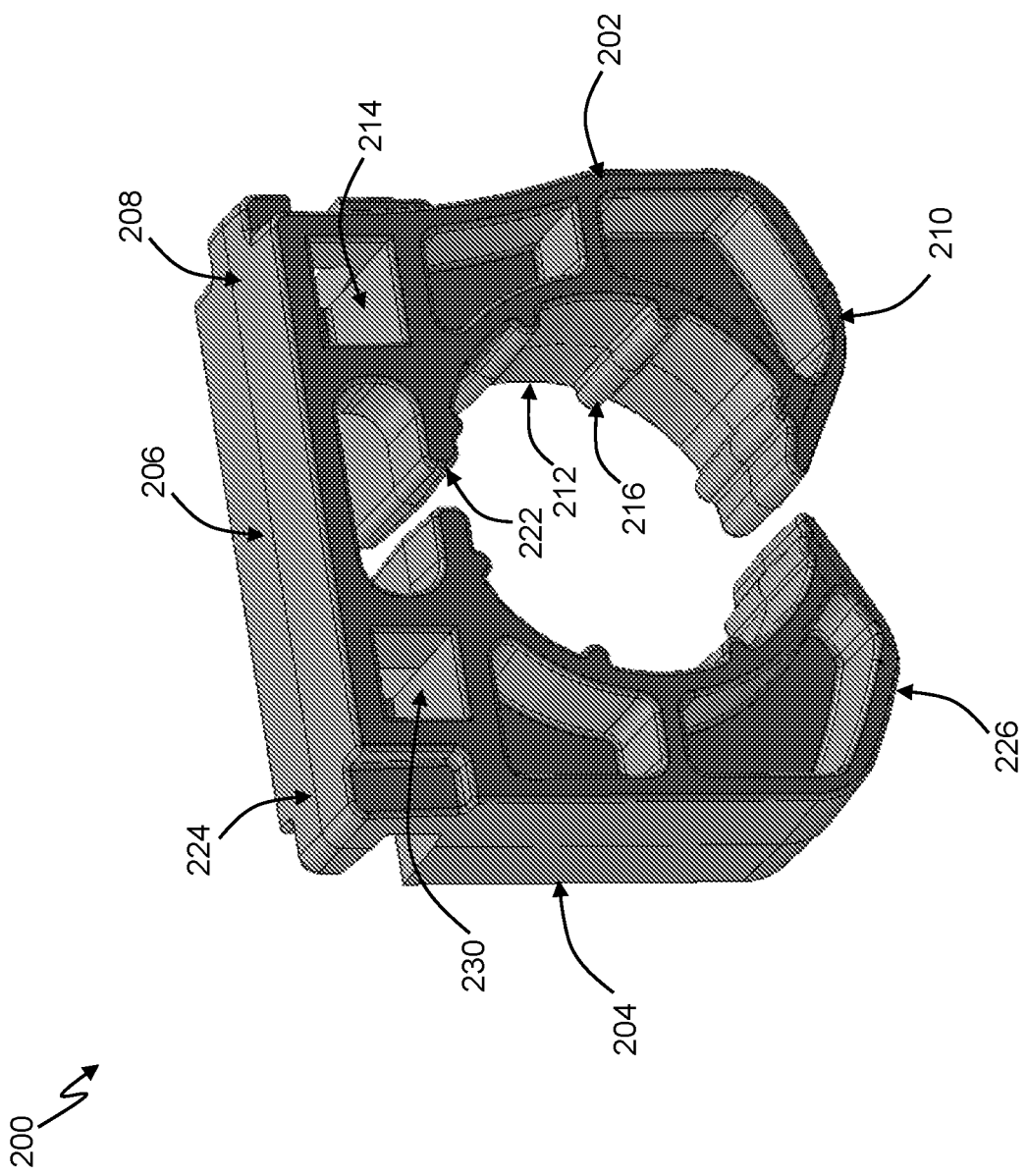

FIGS. 7 and 8 illustrate top perspective views of an open loop "C"-style pipe clamp 200 according to aspects of this disclosure. The pipe clamp 200 is configured to support conduits or pipes including, for example, PEX, CPVC, and copper pipes, from a mounting structure such as a wall stud, floor, ceiling joist, or still other mounting structures. The pipe clamp 200 may be molded out of a plastic, such as, for example, polyethylene, polypropylene, acrylonitrile butadiene styrene (ABS), other thermoplastic polymers, or still other plastics.

The pipe clamp 200 includes a first arm 202, a second arm 204, and a hinge 206 (e.g. a flex hinge) positioned between the first arm 202 and the second arm 204. The first arm 202 has a first mounting end 208 and a first insertion end 210. The first arm 202 defines an arcuate recess 212, and further defines a channel 214. The arcuate recess 212 is defined by an inner surface of the first arm 202 and extends at least partially from the first mounting end 208 to the first insertion end 210. The inner surface of the first arm 202 may include one or more axially extending ribs 216 spaced circumferentially about the inner surface. The ribs 216 extend from a front end 218 of the clamp 200 to a back end 220 of the clamp 200.

The first arm 202 includes a first extension element 222 that extends from the first arm 202 in a direction towards the second arm 204. The first extension element 222 is positioned radially inward from the hinge 206. An inner surface of the first extension element 222 defines a portion of a tangential contact with a pipe when the pipe is positioned within a pipe recess of the clamp 200.

The second arm 204 has a second mounting end 224 and a second insertion end 226. The second arm 204 defines an arcuate recess 228, and further defines a channel 230. The arcuate recess 228 is defined by an inner surface of the second arm 204 and extends at least partially from the second mounting end 224 to the second insertion end 226. The inner surface of the second arm 204 may include the one or more axially extending ribs 216 spaced circumferentially about the inner surface. The second arm 204 includes a second extension element 232 that extends from the second arm 204 in a direction towards the first arm 202. The second extension element 232 is positioned radially inward from the hinge 206. An inner surface of the second extension element 232 defines a portion of the arcuate recess 228.

The hinge 206 is connected to the first mounting end 208 of the first arm 202 and the mounting end 224 of the second arm 204. The first arm 202 is rotatable relative to the second arm 204 about the hinge 206. Rotation of the first arm 202 relative to the second arm 204 in one direction causes the first insertion end 210 of the first arm 202 to move away from the second insertion end 226 of the second arm 202, and rotation of the first arm 202 relative to the second arm 204 in an opposing direction causes the first insertion end 210 of the first arm 202 to move toward from the second insertion end 226 of the second arm 202.

Figure 9A:
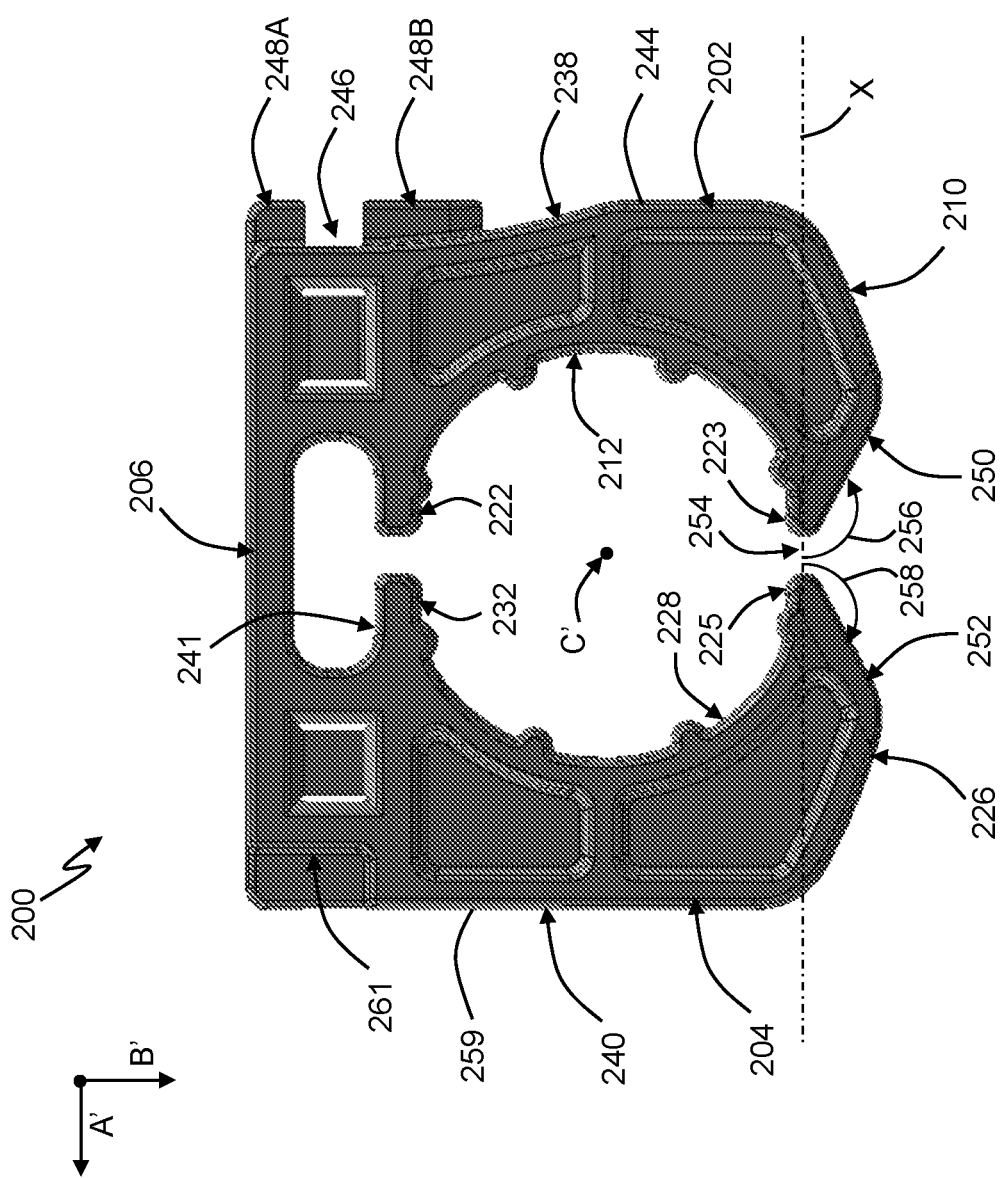
FIGS. 9A and 9B illustrate a front view and a back view of the pipe clamp shown in FIGS. 7 and 8, according to aspects of this disclosure.
Figure 9B:
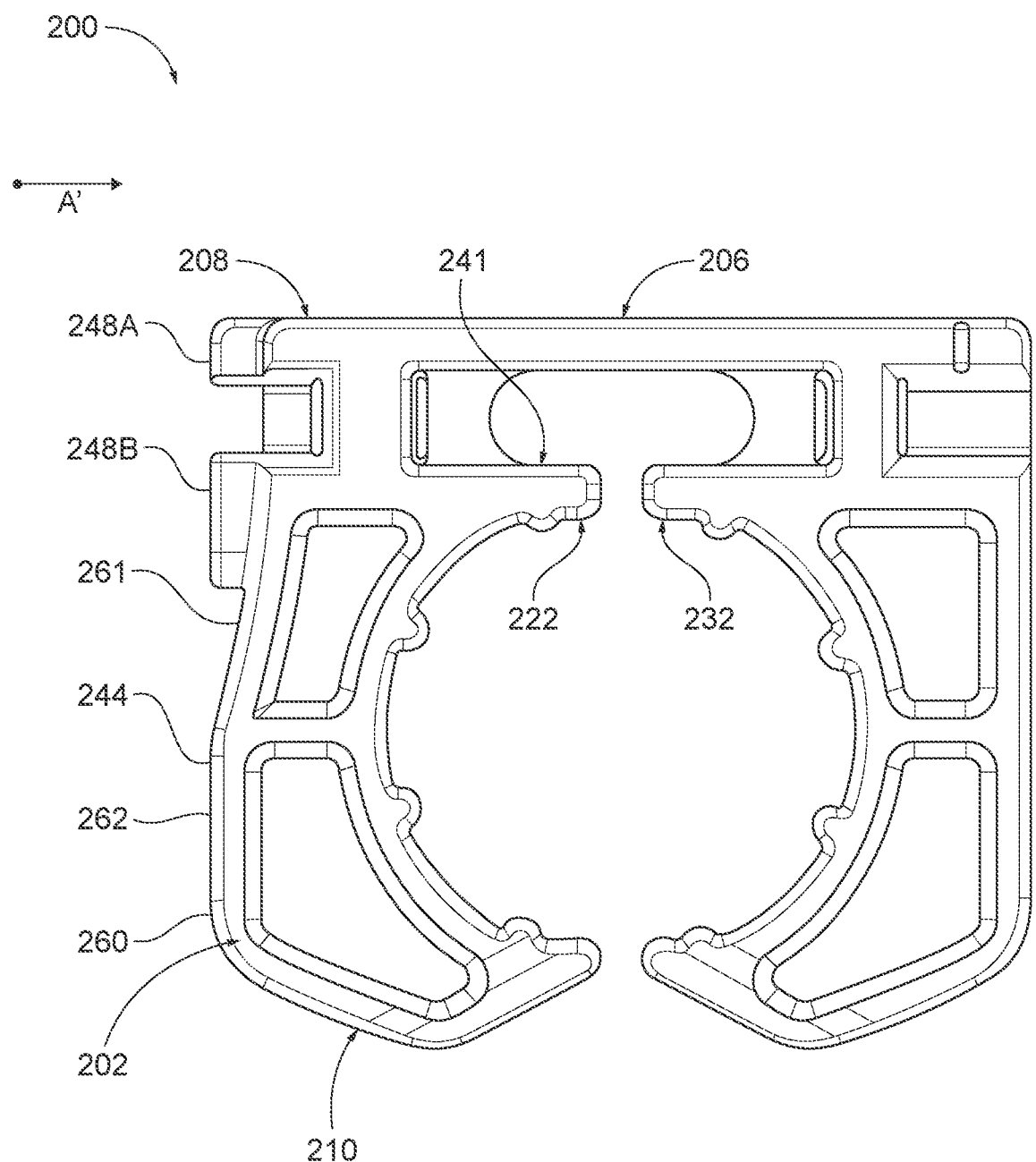
Figure 10B:
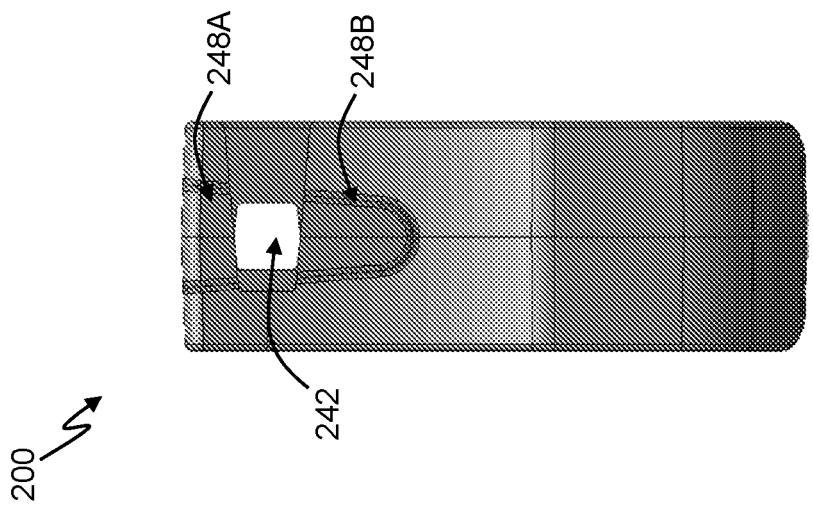
FIGS. 10A and 10B illustrate a first side view and a second side view of the pipe clamp shown in FIGS. 7 and 8, according to aspects of this disclosure.
Figure 10A:
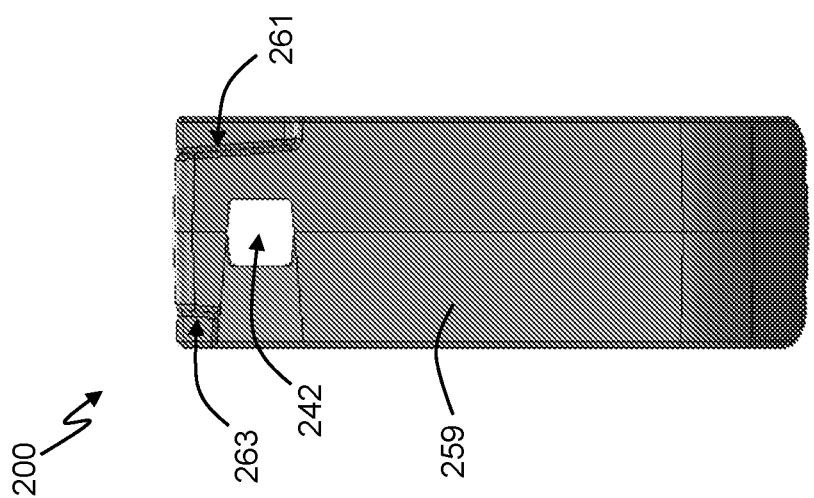

FIGS. 9A and 9B illustrate a front view and a back view of the pipe clamp 200, respectively, and FIGS. 10A and 10B illustrate a first side view and a second side view of the pipe clamp 200, respectively, according to aspects of this disclosure. The hinge 206, the first extension element 222, and the second extension element 232 define a flex recess 241 therebetween. The flex recess 241 may include a rounded rectangular shape when viewed from the front of the clamp 100 (see FIG. 9A). The flex recess 241 is shaped and/or sized to enhance the flexibility of the hinge 206.

The pipe clamp 200 has an insertion end 238 and a mounting end 240 spaced apart from the insertion end 238 in an insertion direction A'. The pipe clamp 200 defines a mounting channel 242 that extends through the pipe clamp 200 in the insertion direction A' from the insertion end 238 to the mounting end 240. The mounting channel 242 comprises the channel 214 defined by the first arm 202, the channel 230 defined by the second arm 204, and the flex recess 241. The mounting channel 242 is configured to receive a fastener (e.g. nail, screw, bolt or other similar type of fastener) therethrough from the insertion end 238 to the mounting end 240.

The first arm 202 has an outer surface 244 that extends along at least a portion of the insertion end 238 of the pipe clamp 200. The outer surface 244 defines an opening 246 to the mounting channel 242. The first arm 202 includes a relief protrusion 248A,B that extends from the outer surface 244 in a direction opposite the insertion direction A'. The relief protrusion 248A,B may be configured substantially similarly to the relief protrusion 148A,B of the pipe clamp 100 described above.

The outer surface 244 extends along the insertion end 238 of the pipe clamp 200 from the opening 246 of the mounting channel 242 to the first insertion end 210 of the first arm 202. The outer surface 244 may be curved such that the outer surface 244 at the opening 246 is spaced from the outer surface 244 at a location toward the first insertion end 210 along the insertion direction A'. The curvature of the outer surface 244 forms a prying support (e.g. hammer support) for supporting the prying tool during removal of the fastener positioned within the mounting channel 242.

The first arm 202 has an outer surface 244 that extends from the first mounting end 208 to the first insertion end 210, wherein the outer surface 244 includes a first curved portion 260 adjacent to the first insertion end 210, a second curved portion 261 adjacent to the first mounting end 208, and a flat portion 262 extending between the first insertion end 210 and the first mounting end 208. The first arm 202 includes a relief protrusion 248A,B that extends from the second curved portion 261 of the outer surface 244.

The arcuate recess 212 defined by the first arm 202 and the arcuate recess 228 defined by the second arm 204 extend in a substantially circumferential direction about a center C' of the pipe clamp 200. Each of the arcuate recesses 212 and 228 comprise a pipe recess configured to receive a pipe within the clamp 200. The center C' is positioned on a pipe support axis that extends through the pipe clamp 200 from the front end 218 to the back end 220. The pipe support axis is substantially perpendicular to the insertion direction A' and is positioned to align with a pipe axis of a pipe received within the pipe recess.

In an aspect, the arcuate recess 212 of the first arm 202 and the arcuate recess 228 of the second arm 204 extend about the center C' of the pipe clamp 100 at a substantially similar arc angle. In an aspect, the arcuate recess 212 of the first arm 202 and the arcuate recess 228 of the second arm 204 form mirror images of each other when viewed from the front (see FIG. 9A). In an aspect, each of the arcuate recesses 212 and 228 extend about the center C' at an arc angle of less than 180°. When a pipe is received within the pipe recess, the inner surface of the first arm 202 and the inner surface of the second arm 204 provide a force to an outer surface of the pipe to hold the pipe within the pipe recess. The force is provided by a flexibility force of the hinge 206.

The first arm 202 and the second arm 204 may be integrally formed with the hinge 206 such that the first arm 202, the second arm 204, and the hinge 206 form a single unitary member. The hinge 206 may comprise a flexible hinge that is configured to apply a force to each of the arms 202 and 204 when a pipe is inserted into the pipe recess.

The first insertion end 210 of the first arm 202 and the second insertion end 226 of the second arm 204 define a first lead-in surface 250 and a second lead-in surface 252, respectively. Each of the first and second lead-in surfaces 250 and 252 extend at first and second angles 256 and 258, respectively, relative to an axis X that extends through an opening 254 defined between the first and second insertion ends 210 and 226 of the first and second arms 202 and 204. In an aspect, the first angle 256 of the first lead-in surface 250 extends at an angle that is greater than 45° and less than 180°. In an aspect, the first angle 256 extends an angle of approximately 50°. In an aspect, the second angle 258 of the second lead-in surface 252 extends at an angle that is greater than 45° and less than 180°. In an aspect, the second angle 258 extends an angle of approximately 50°. In an aspect, the combined angle (e.g. the angle between the first lead-in surface 250 and the second lead-in surface 252) is at least 100°. Both the first and second angles 256 and 258 may extend at approximately the same angle. The first and second lead-in surfaces 250 and 252 may extend linearly outward from the opening 254.

Figure 11A:
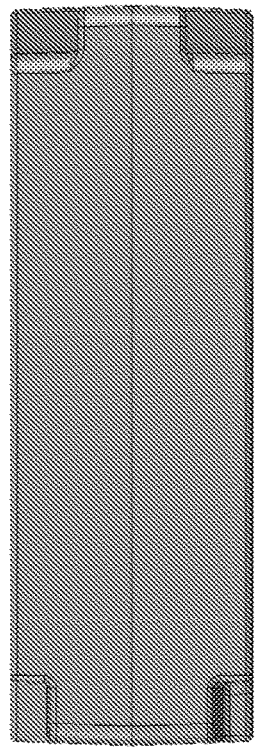
FIGS. 11A and 11B illustrate a top view and a bottom view of the pipe clamp show in FIGS. 7 and 8, according to aspects of this disclosure.
Figure 11B:
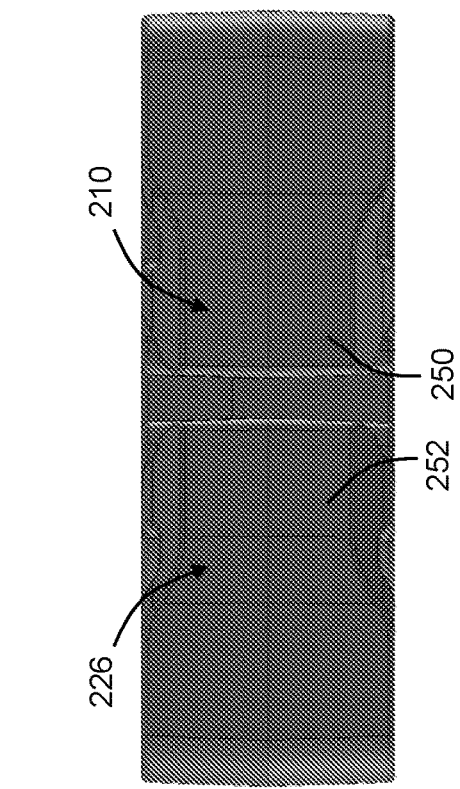

FIGS. 11A and 11B illustrate a top view and a bottom view of the pipe clamp 200, respectively. The first lead-in surface 250 of the first arm 202 and the second lead-in surface 252 of the second arm 204 may be chamfered such that a thickness of the lead-in surfaces 250 and 252 is less than a thickness of the corresponding first and second mounting ends 208 and 224, respectively.

Figure 12:
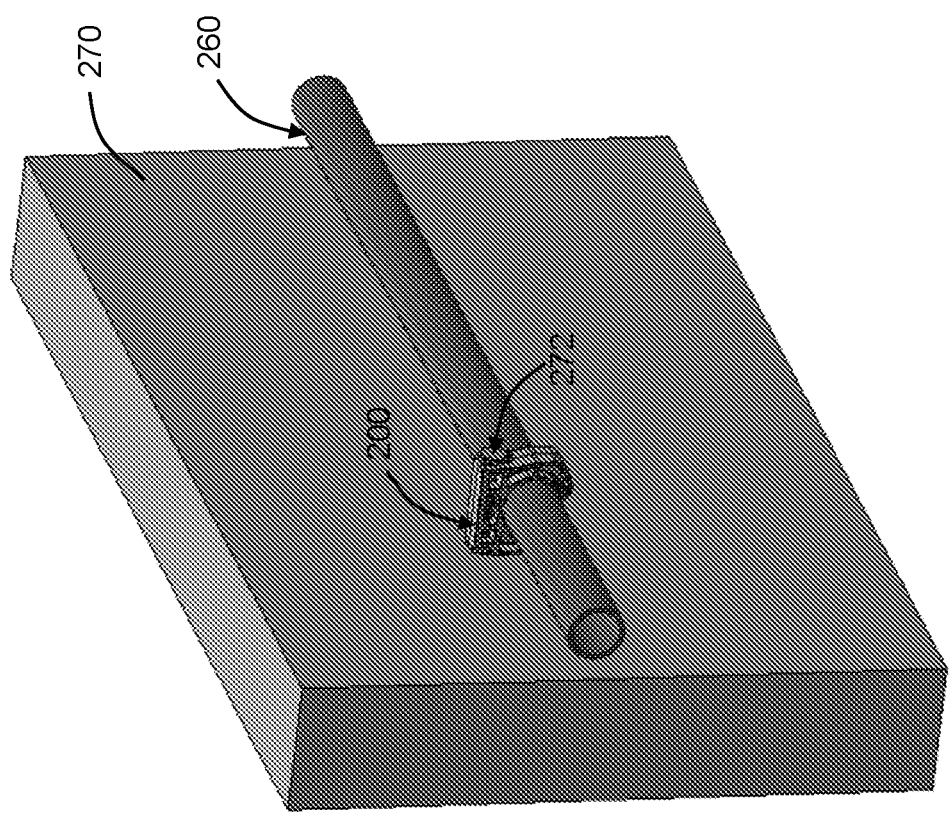
FIG. 12 illustrates a perspective view of the pipe clamp shown in FIGS. 7 and 8 supporting a pipe from a mounting surface, according to an aspect of this disclosure.

FIG. 12 illustrates a perspective view of the pipe clamp 200 supporting a pipe 260 from a mounting surface 270, according to an aspect of this disclosure. One example of a method for supporting the pipe 260 from the mounting surface 270 commences by inserting the pipe 260 into the pipe recess of the pipe clamp 200 through the opening 254. As the pipe 260 is inserted, the first arm 202 rotates relative to the second arm 204 about the hinge 206 such that the opening 254 expands. In an aspect, during insertion of the pipe 260, an outer surface of the pipe 260 contacts the first and second lead-in surfaces 250 and 252. The contact between the pipe 260 and the first and second lead-in surfaces 250 and 252 may cause the rotation of the first arm 202 relative to the second arm 204.

After the pipe 260 is inserted, the pipe 260 is held within the pipe recess by the inner surface of the first arm 202 and the inner surface of the second arm 204. When the pipe 260 is secured within the pipe recess, an outer surface of the pipe 260 contacts the ribs 216 of the first and second arms 202 and 204. The outer surface of the pipe 160 also contacts distal ends of each of the first and second extension elements 222 and 232. The ribs 216, the distal ends of the first and second extension elements 222 and 232, and distal ends 223 and 225 of the first and second arms 202 and 204 provide diametrical support to the pipe 260.

After the pipe 260 is secured within the pipe recess, the pipe clamp 200 is mounted to the mounting surface 270. The pipe clamp 200 may be aligned with the mounting surface 270 such that a mounting surface 259 of the second arm 204 lies flush against the mounting surface 270 at a location where the pipe 260 is to be supported. A fastener 272 is inserted into the opening 246, through the mounting channel 242, and through the mounting surface 270, thereby securing the pipe clamp 200 to the mounting surface 270.

Figure 13B:
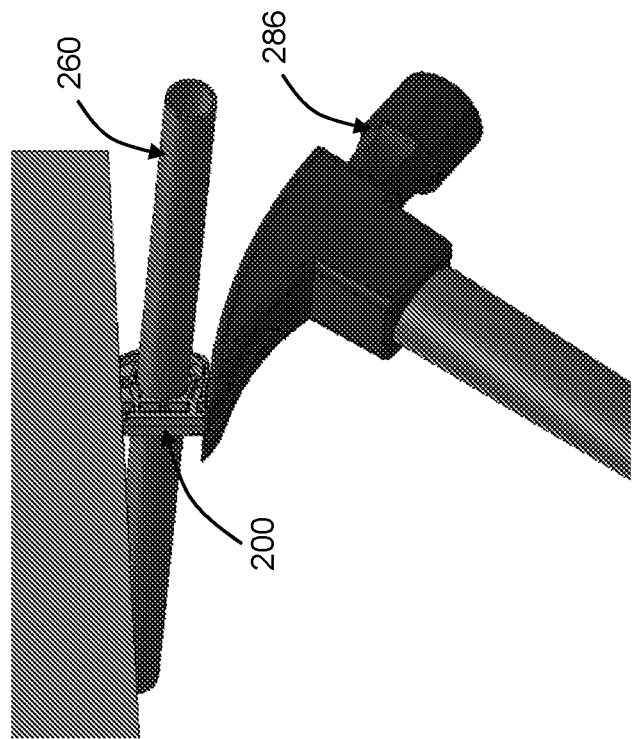
FIGS. 13A, 13B, and 14 illustrate perspective views of the pipe clamp shown in FIGS. 7 and 8 supporting a pipe from a mounting surface, and prying tools, according to aspects of this disclosure.
Figure 13A:
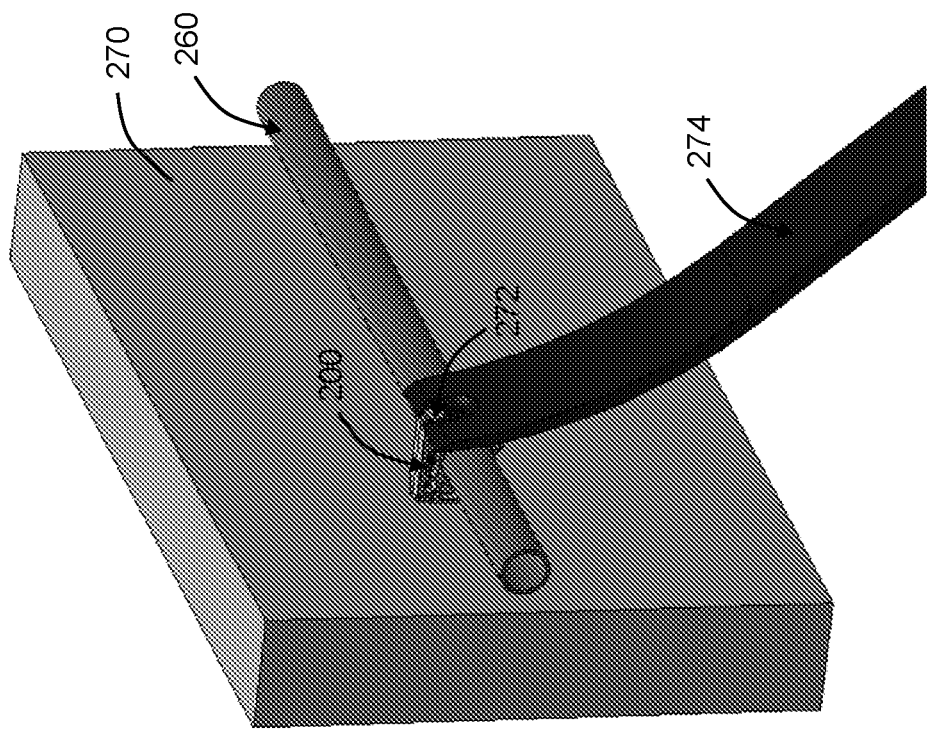
Figure 14:
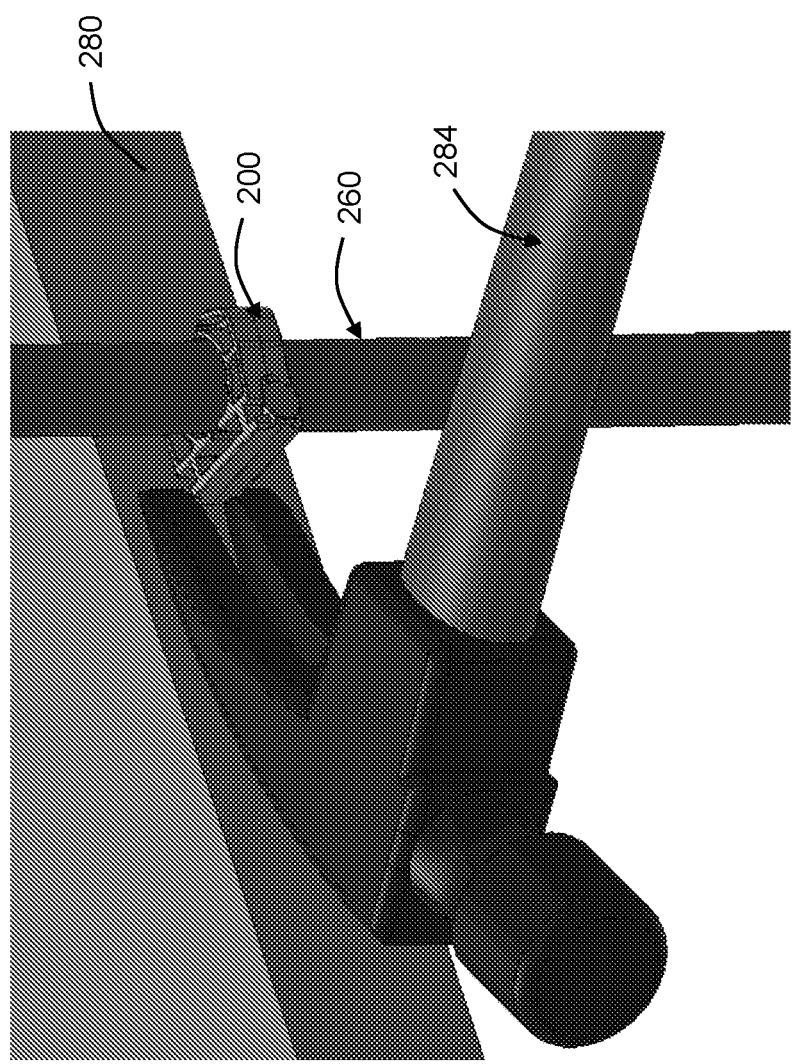

FIGS. 13A and 13B illustrate perspective views of the pipe clamp 200 supporting the pipe 260 from the mounting surface 270. The pipe clamp 200 may be removed from the mounting surface 270 by a prying tool 274 or a hammer 286 in a substantially similar manner as the pipe clamp 100 is removed from the mounting surface 170, as described above. Alternatively, the pipe clamp 200 may be removed from a mounting surface 280 by a prying tool 284. FIG. 14 illustrates a perspective view of the pipe clamp 200 mounted to the mounting surface 280. The mounting surface 259 of the second arm 204 may define first and a second relief recesses 261 and 263 that are recessed from the mounting surface 259 such that the relief recesses 261 and 263 are is spaced apart from the mounting surface 280 of the mounting structure when the pipe clamp 200 is mounted to the mounting surface 280. The pipe clamp 200 may be removed from the mounting surface 280 by positioning an end of a prying tool 284 within the first and second relief recesses 261 and 263, and prying the clamp 200 away from the mounting surface 280.

Figure 15:
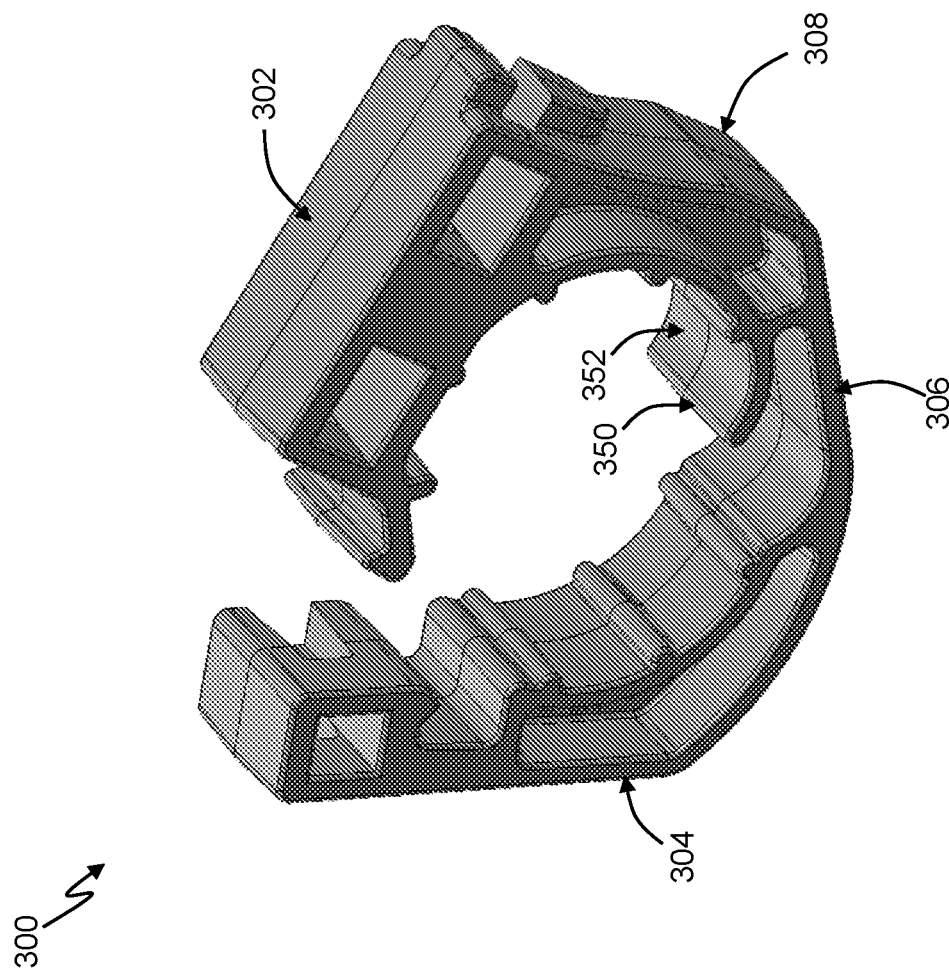
FIGS. 15 through 17 illustrate a third aspect of a pipe clamp, according to aspects of this disclosure.
Figure 16:
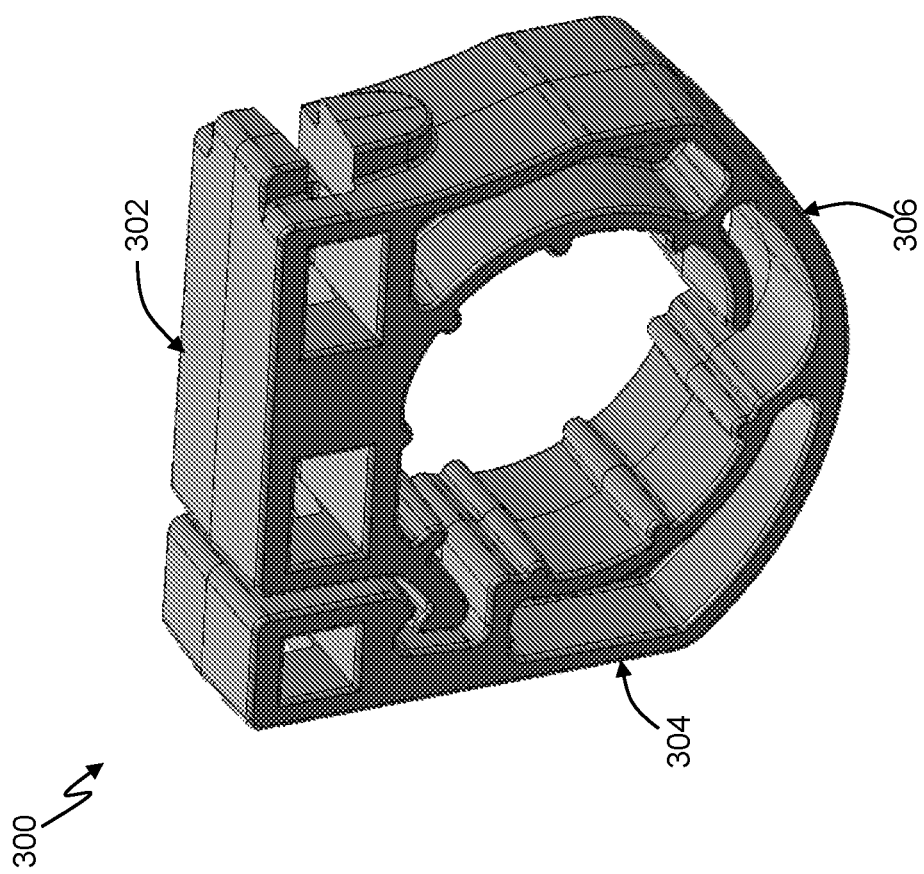
Figure 17:
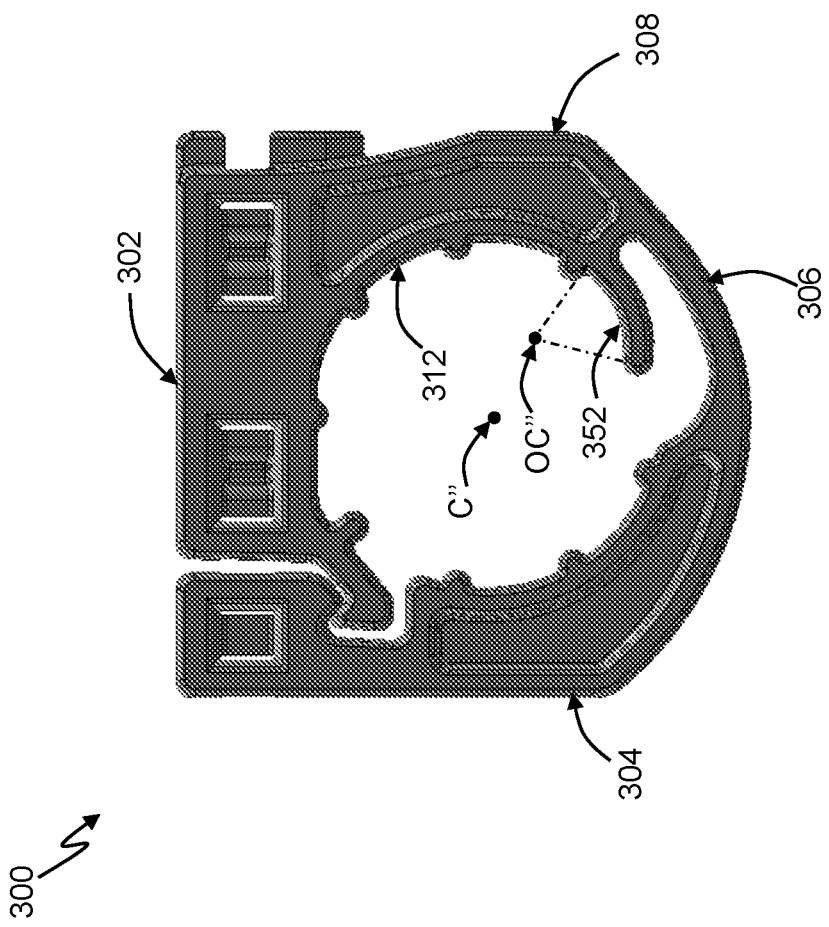

FIGS. 15 through 17 illustrate an alternate aspect of a full pipe clamp 300, according to aspects of this disclosure. Portions of the alternate aspect of the pipe clamp 300 disclosed in FIGS. 15 through 17 are similar to aspects of the full pipe clamp 100 described above in FIGS. 1 through 6 and those portions function similarly to those described above. The pipe clamp 300 includes a mounting post 302, an arm 304, and a hinge 306 positioned between the mounting post 302 and the arm 304. The mounting post 302 may be transitioned between the open position and the closed position in a substantially similar manner as the mounting post 102.

The mounting post 302 includes an extension element 350 that extends from a first post end 308. With reference to FIG. 15, the extension element 350 is positioned adjacent to and radially inward from the hinge 306. An inner surface of the extension element 350 defines an arcuate recess 352.

An arcuate recess 312 defined by the mounting post 302 extends in a substantially circumferential direction about a center C" of the pipe clamp 300. The arcuate recess 352 of the extension element 350 extends in a substantially circumferential direction about an off-center OC" location, which is off-set from the center C" of the pipe clamp 300.

After a pipe is inserted into the pipe recess, the arcuate recess 312 of the mounting post 302 and the arcuate recess 352 of the extension element 350 extend about an outer surface of the pipe at an arc angle of greater than 180°, and the off-center location OC" may be transitioned to substantially align with the center C" of the pipe recess. In an aspect, the arcuate recess 312 of the mounting post 302 extends about the center C" of the pipe clamp 300 at an arc angle of approximately 180°.

Figure 18:
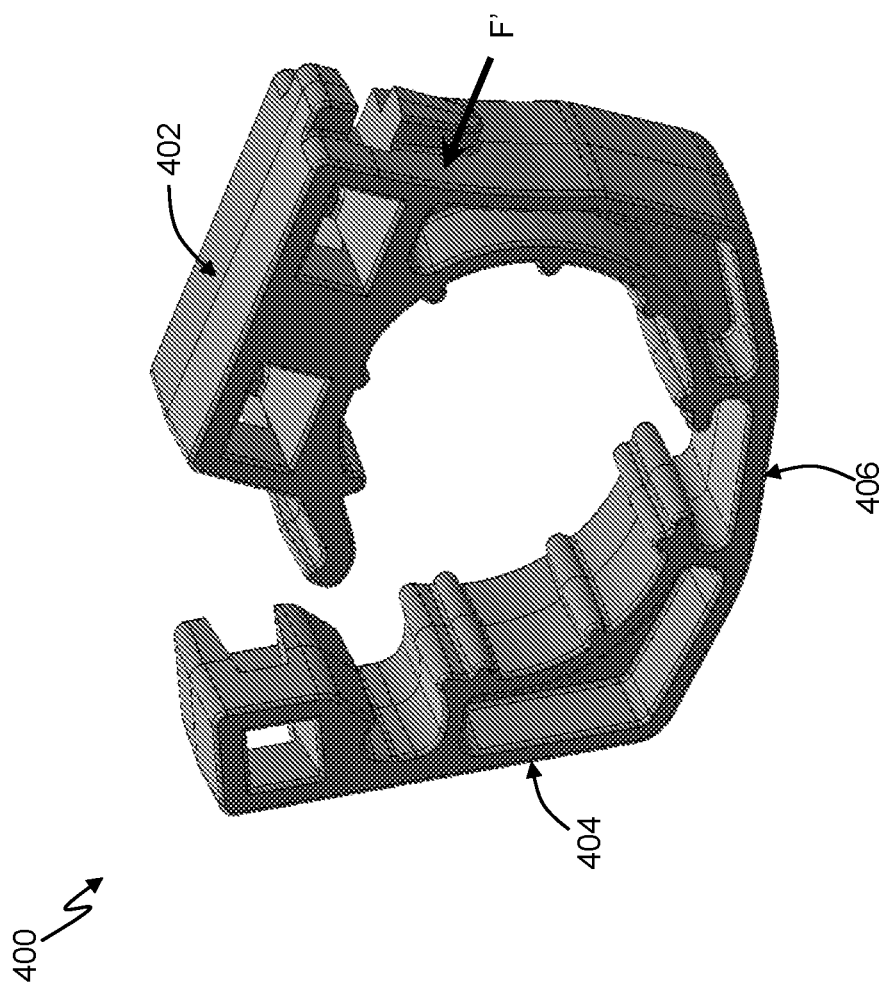
FIGS. 18 through 20 illustrate a fourth aspect of a pipe clamp, according to aspects of this disclosure.
Figure 19:
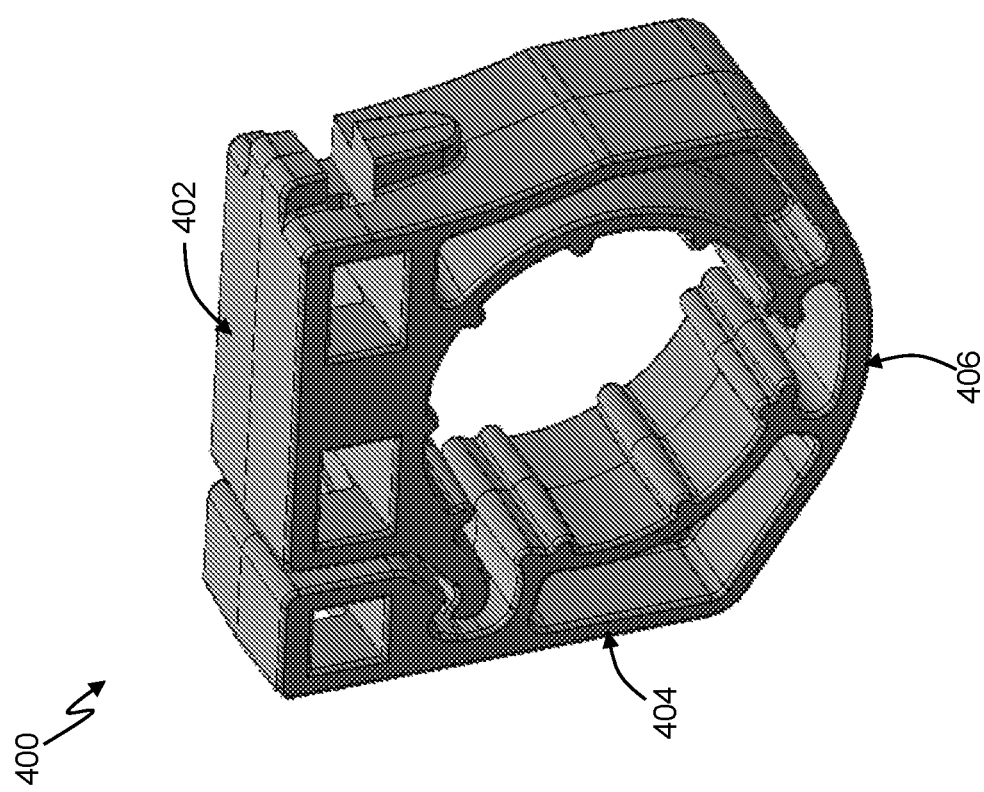
Figure 20:
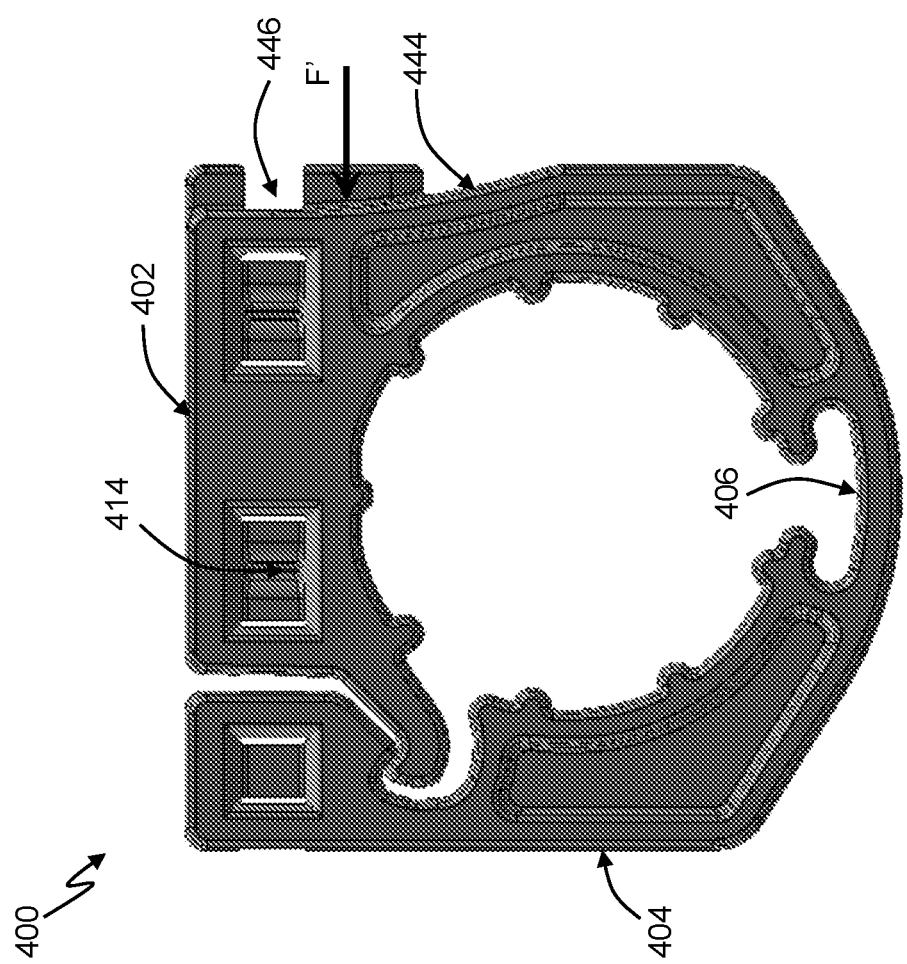

FIGS. 18 through 20 illustrate another alternate aspect of a full pipe clamp 400, according to aspects of this disclosure. Portions of the alternate aspect of the pipe clamp 400 disclosed in FIGS. 18 through 20 are similar to aspects of the full pipe clamps 100 and 300 described above in FIGS. 1 through 6 and 15 through 17, and those portions function similarly to those described above. The pipe clamp 400 includes a mounting post 402, an arm 404, and a hinge 406 positioned between the mounting post 402 and the arm 404.

The mounting post 402 may be transitioned to the closed position by applying a force F' to the mounting post 402 in a post direction C'. The post direction C' is substantially parallel to a post channel 414 that defined by the mounting post 402. The force F' may be applied to an outer surface 444 of the mounting post 402 near an opening 446 of the post channel 414.

Figure 21:
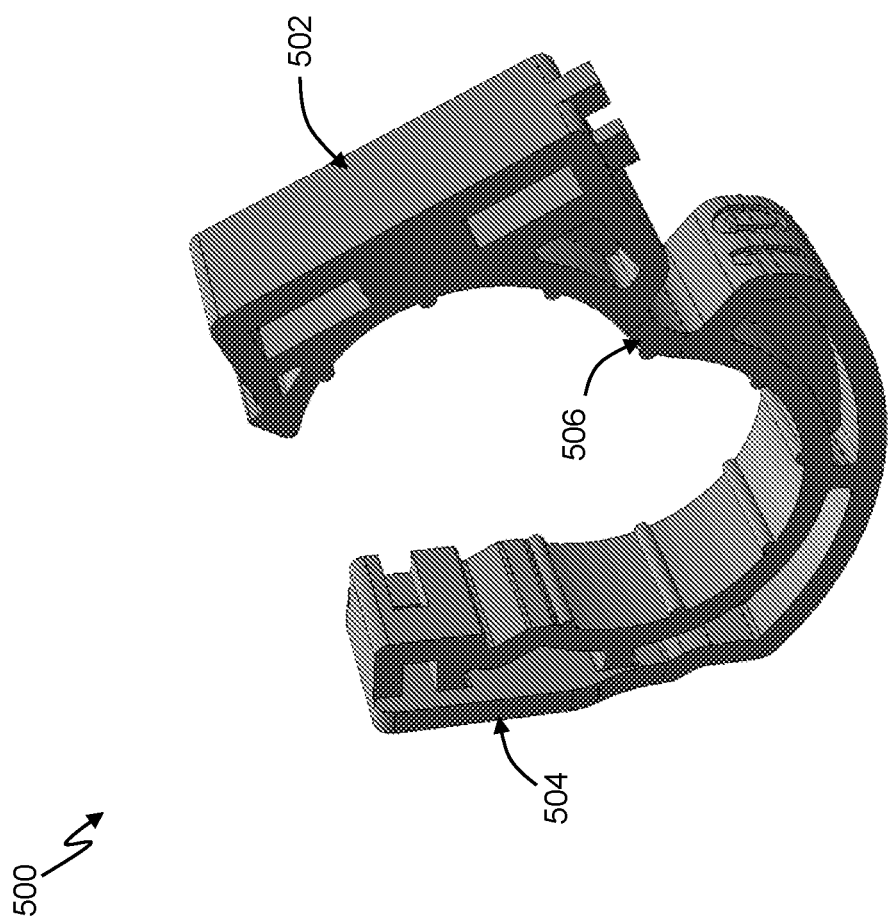
FIGS. 21 through 23 illustrate a fifth aspect of a pipe clamp, according to aspects of this disclosure.
Figure 22:
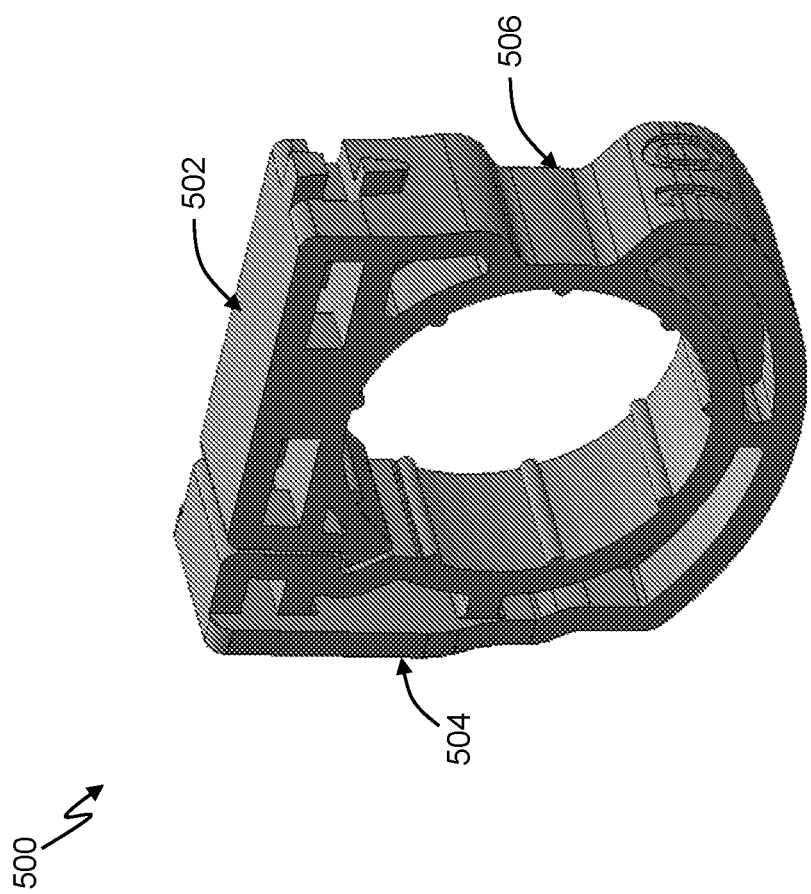
Figure 23:
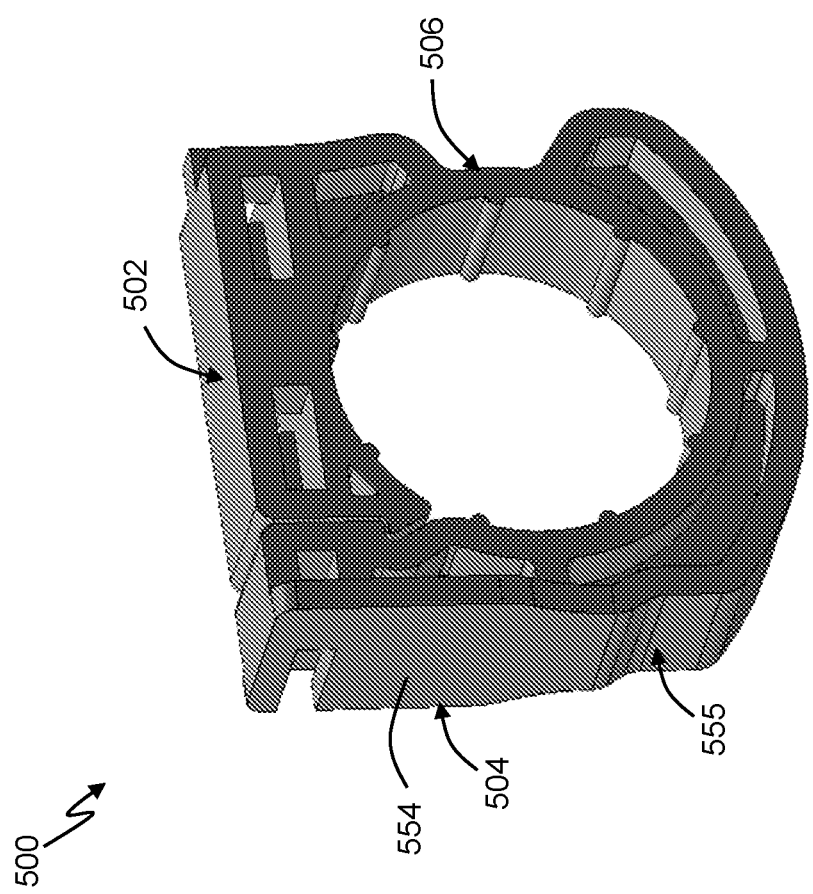
Figure 24:
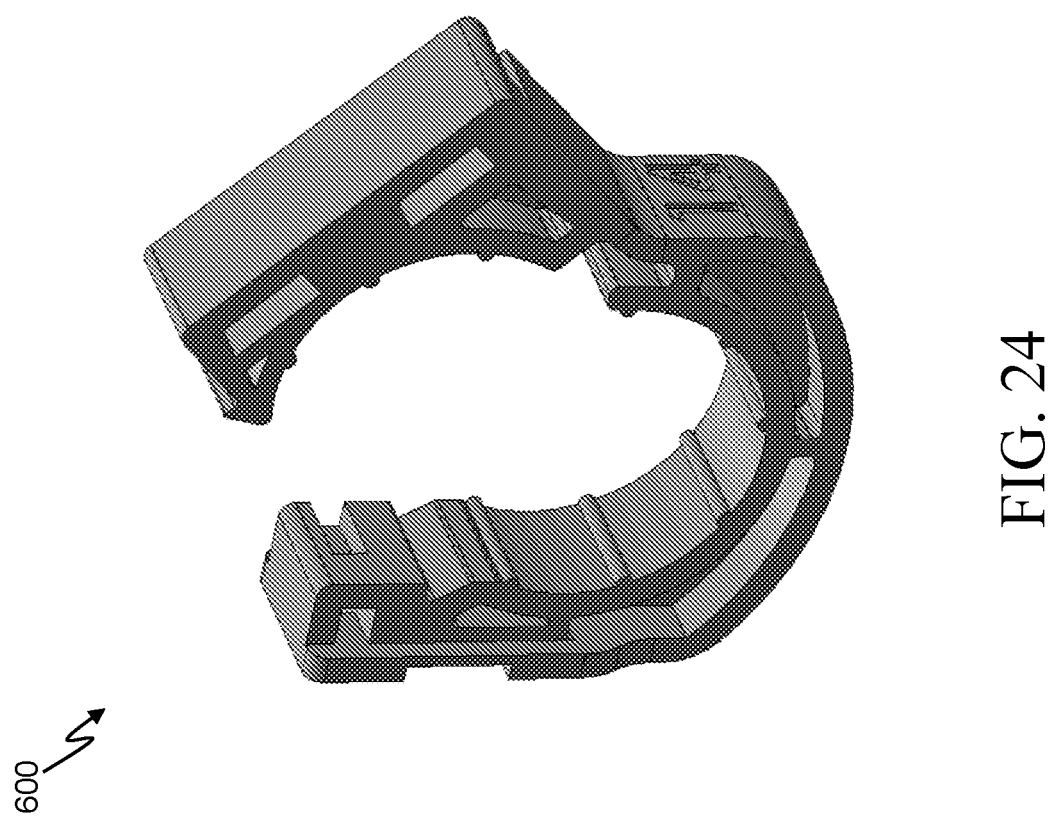
FIGS. 24 through 26 illustrate a sixth aspect of a pipe clamp, according to aspects of this disclosure.
Figure 25:
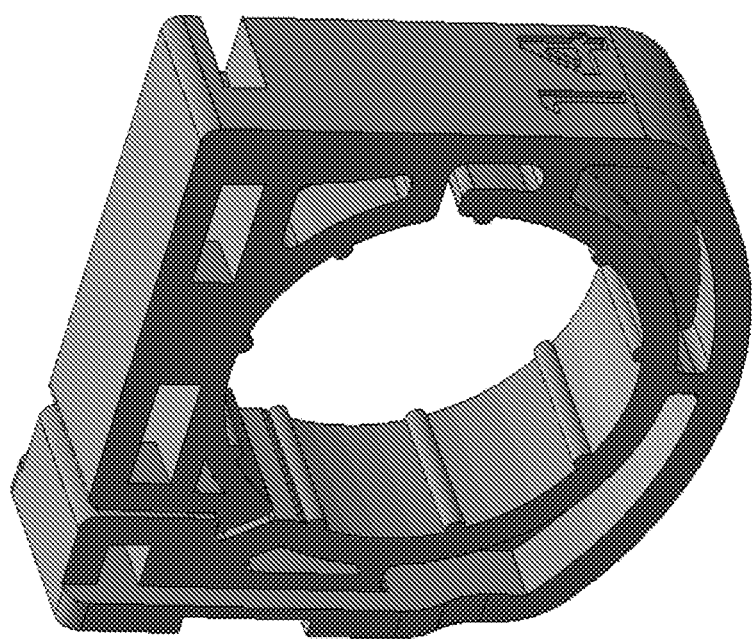
Figure 26:
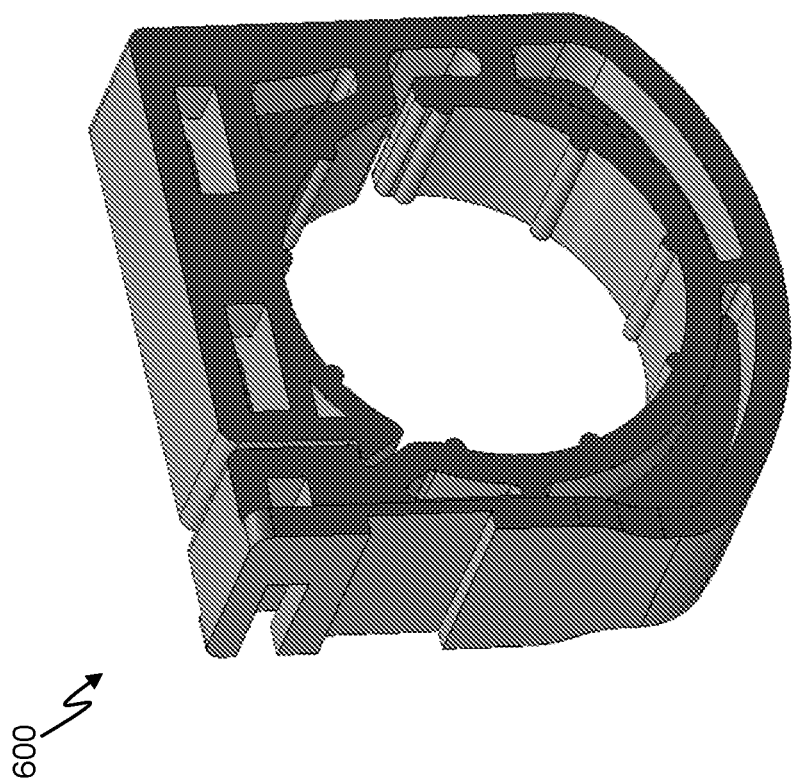
Figure 27:
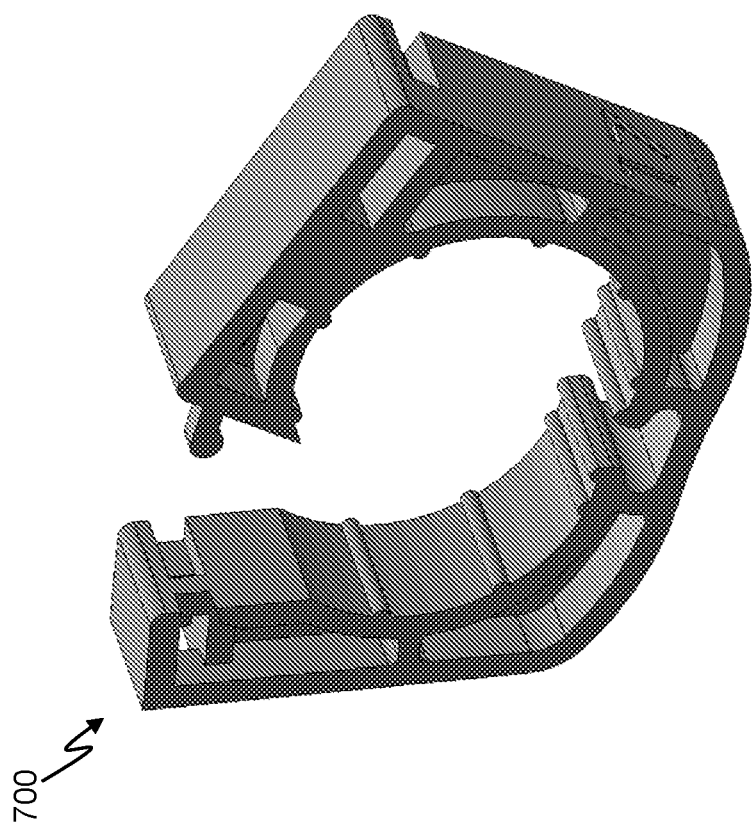
FIGS. 27 through 29 illustrate a seventh aspect of a pipe clamp, according to aspects of this disclosure.
Figure 28:
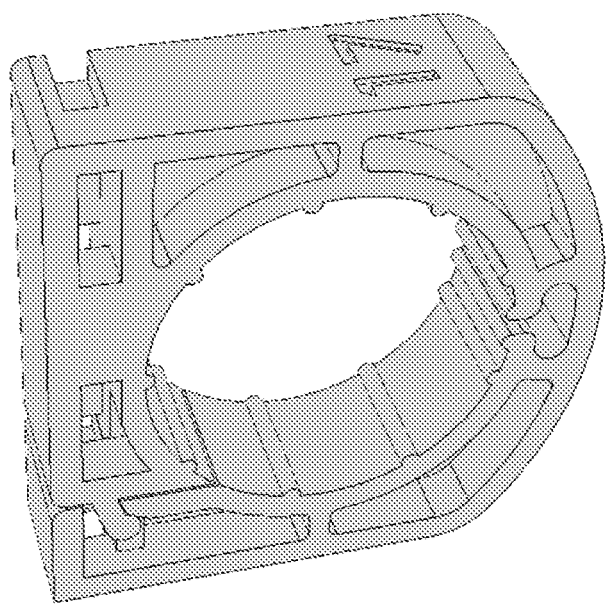
Figure 29:
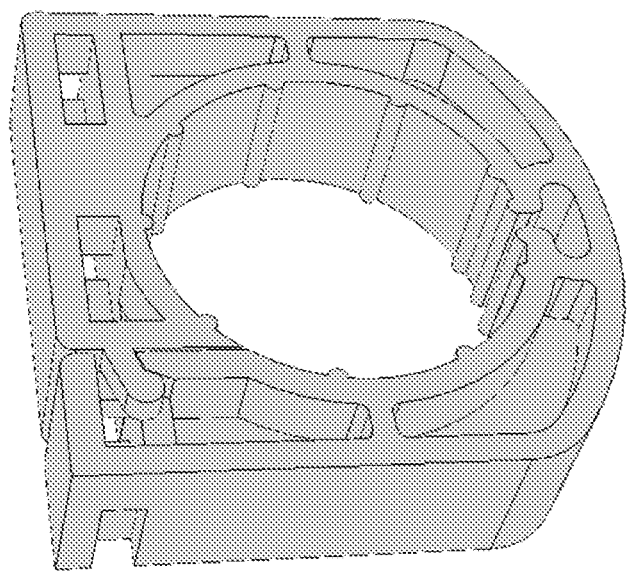
Figure 30:
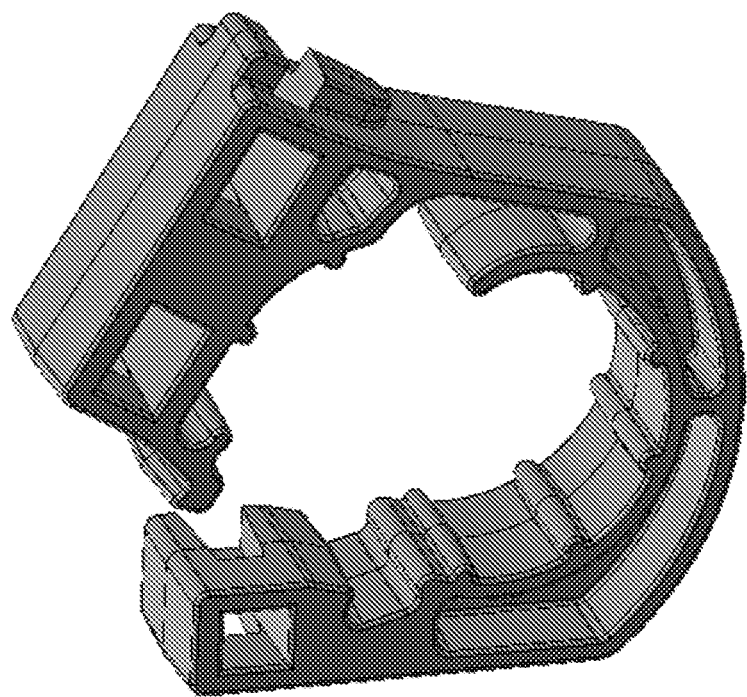
FIGS. 30 through 32 illustrate an eighth aspect of a pipe clamp, according to aspects of this disclosure.
Figure 31:
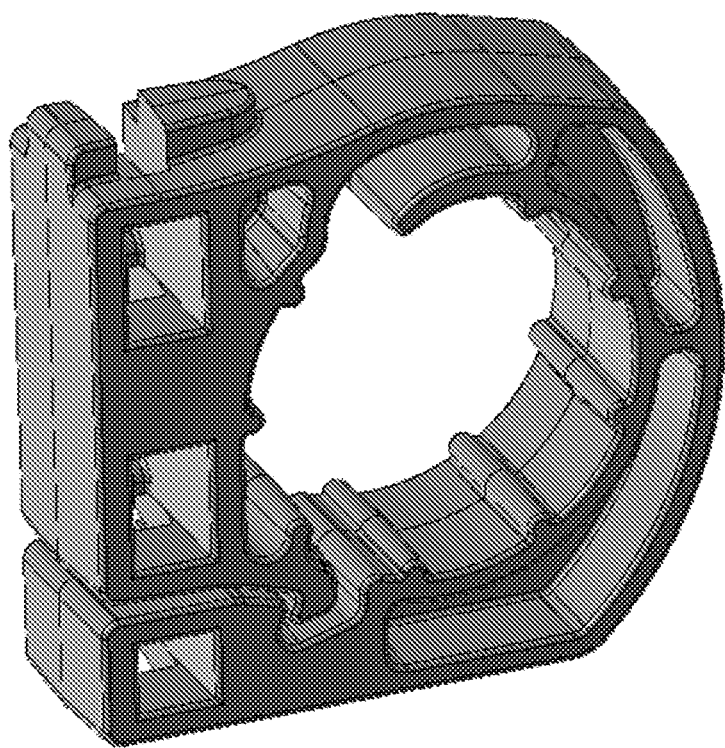
Figure 32:
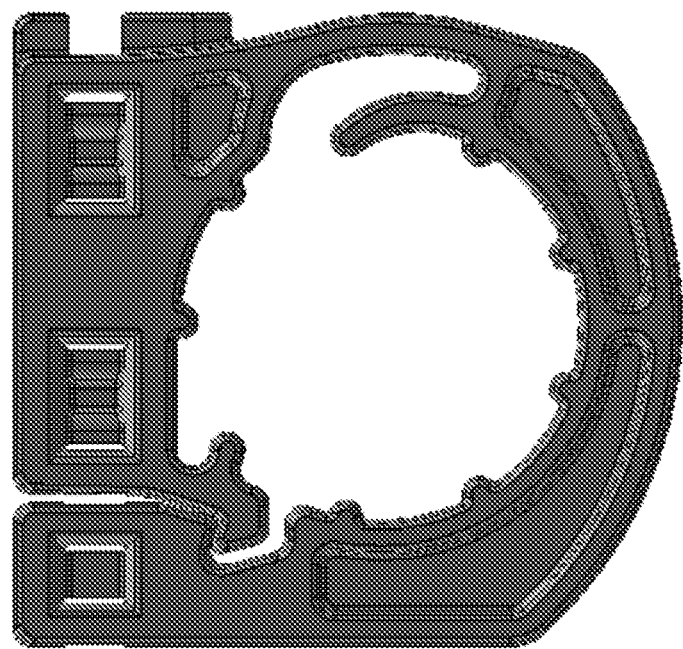
Figure 33:
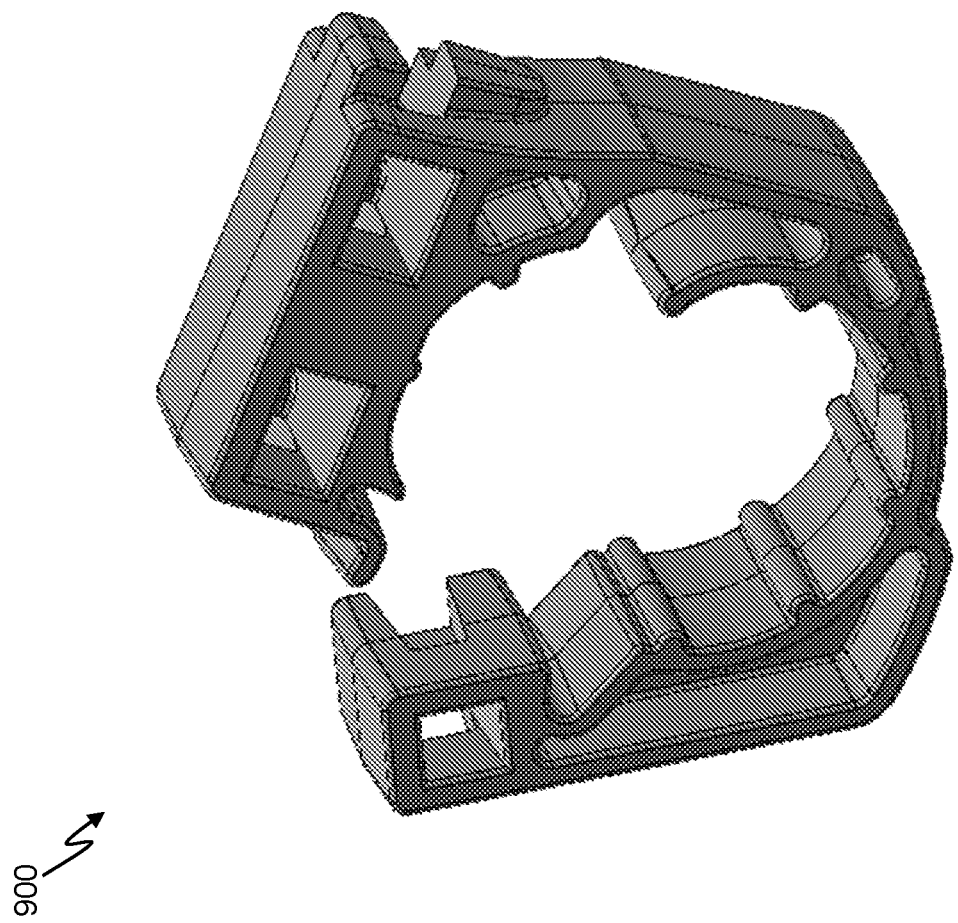
FIGS. 33 through 35 illustrate a ninth aspect of a pipe clamp, according to aspects of this disclosure.
Figure 34:
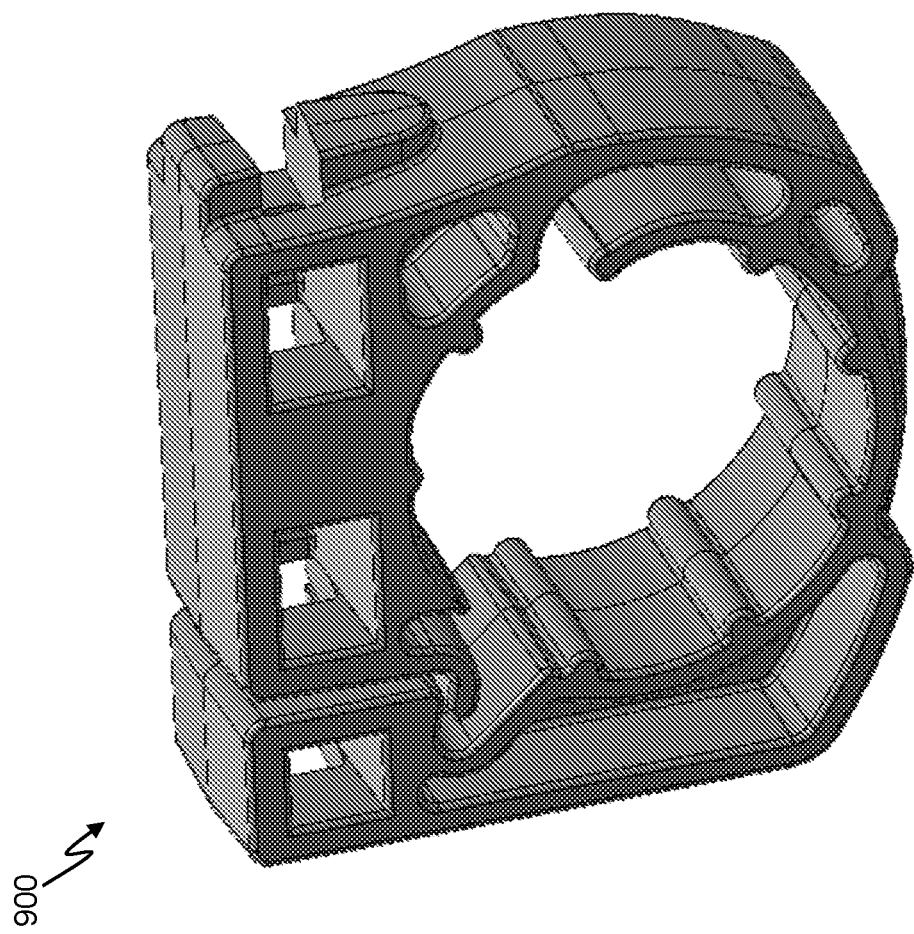
Figure 35:
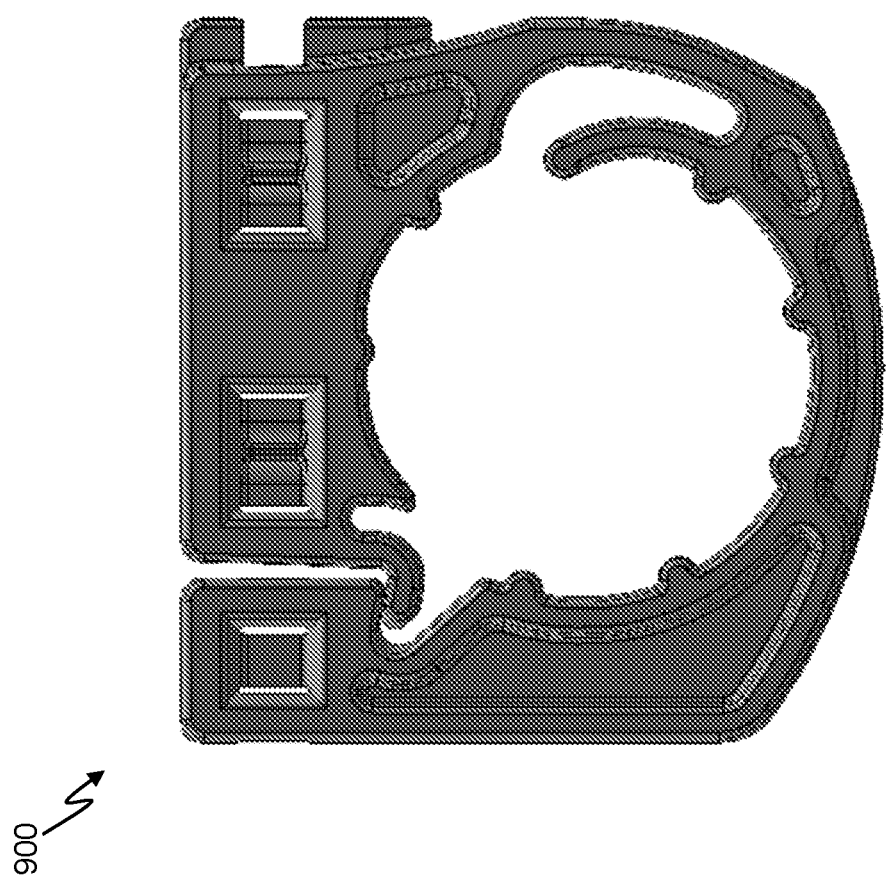

FIGS. 21 through 23 illustrate another alternate aspect of a full pipe clamp 500, according to aspects of this disclosure. Portions of the alternate aspect of the pipe clamp 500 disclosed in FIGS. 21 through 23 are similar to aspects of the full pipe clamps 100, 300, and 400 described above in FIGS. 1 through 6, 15 through 17, and 18 through 20, and those portions function similarly to those described above. The pipe clamp 500 includes a mounting post 502, an arm 504, and a hinge 506 positioned between the mounting post 502 and the arm 504.

During mounting of the pipe clamp 500, the pipe clamp 500 may be aligned with a mounting surface of a mounting structure such that a mounting surface 554 of the arm 504 lies flush against the mounting surface of the mounting structure. The mounting surface 554 may define a relief recess 555 that is recessed from the mounting surface 554 such that the relief recess 555 is spaced apart from the mounting surface of the mounting structure when the pipe clamp 500 is mounted to the mounting structure. In an aspect, the pipe clamp 500 may be removed from the mounting structure by positioning an end of a prying tool within the relief recess 555 and prying the clamp 500 away from the mounting structure.

FIGS. 24 through 35 illustrate other alternate aspects of closed loop full pipe clamps 600, 700, 800, and 900, according to aspects of this disclosure. Portions of the alternate aspects of the pipe clamps 600, 700, 800, and 900 disclosed in FIGS. 24 through 35 are similar to aspects of the full pipe clamps 100, 300, 400, and 500 described above in FIGS. 1 through 6, 15 through 17, 18 through 20, and 21 through 23, and those portions function similarly to those described above.

Figure 36:
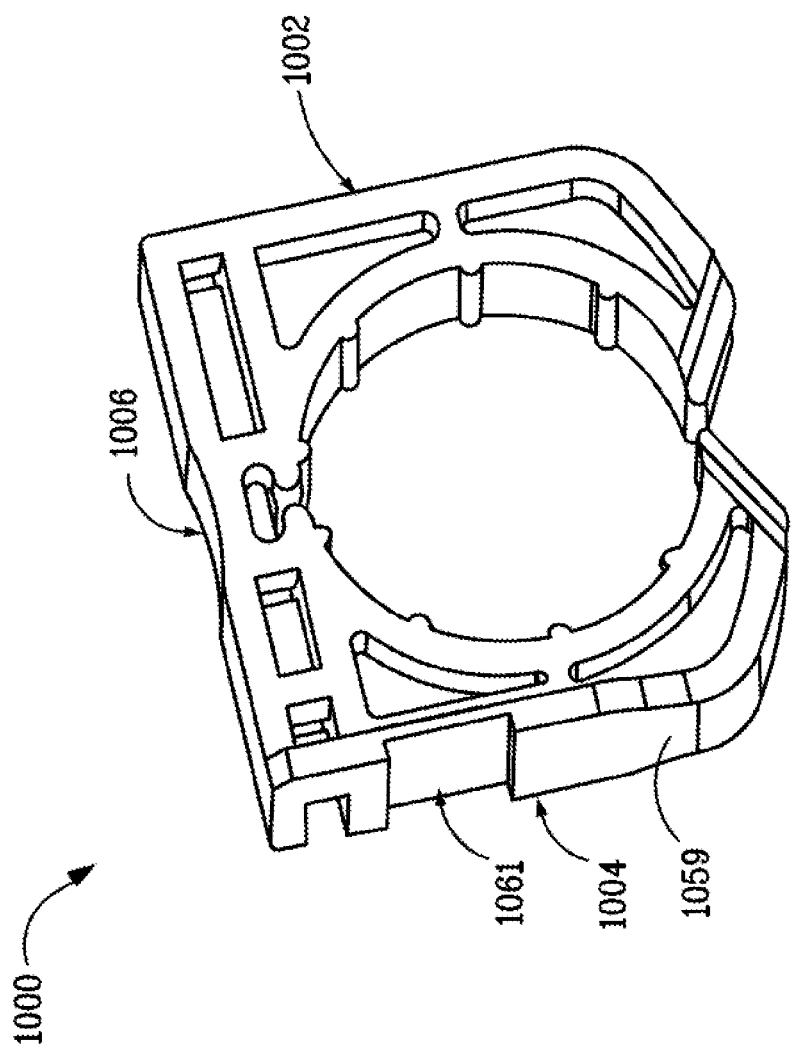
FIGS. 36 and 37 illustrate a tenth aspect of a pipe clamp, according to aspects of this disclosure.
Figure 37:
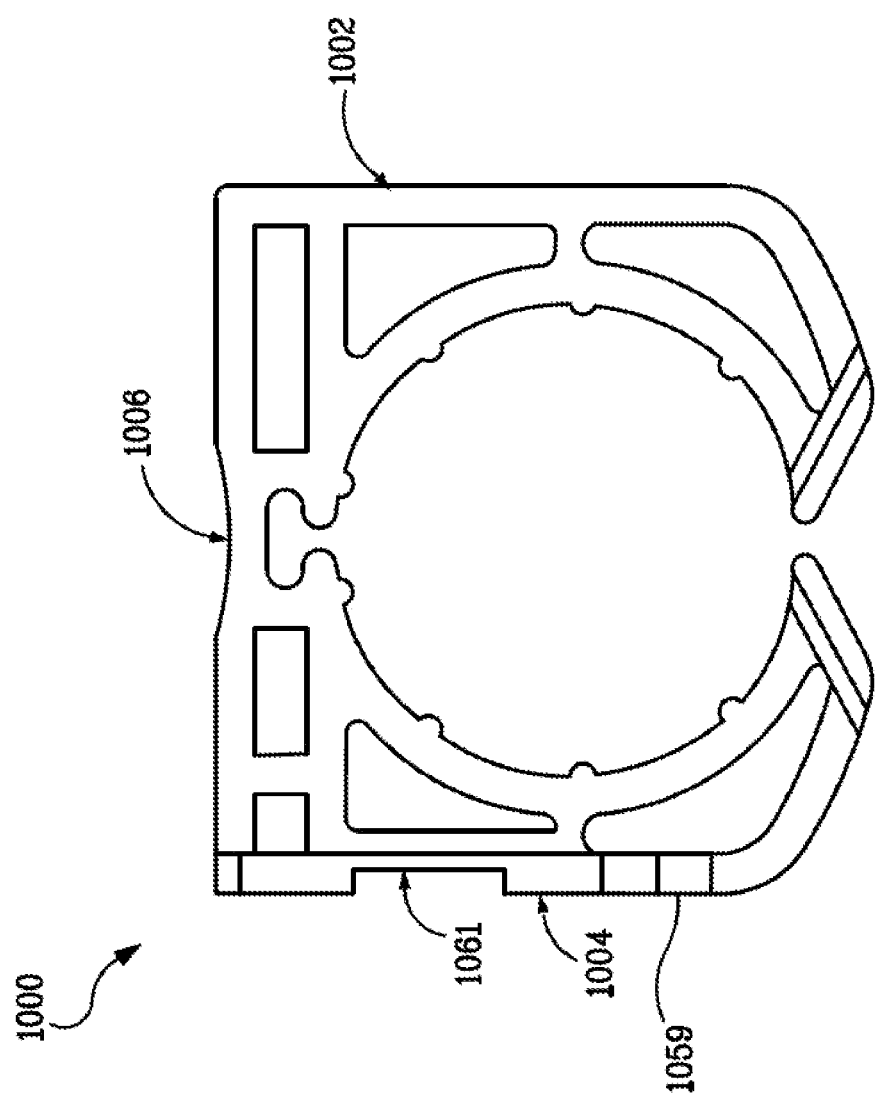

FIGS. 36 and 37 illustrate an alternate aspect of an open loop "C" style full pipe clamp 1000, according to aspects of this disclosure. Portions of the alternate aspect of the pipe clamp 1000 disclosed in FIGS. 36 and 37 are similar to aspects of the open loop "C" style full pipe clamp 200 described above in FIGS. 7 through 14 and those portions function similarly to those described above. The pipe clamp 1000 includes a first arm 1002, a second arm 1004, and a hinge 1006 positioned between the first arm 1002 and the second arm 1004. The second arm 1004 includes a mounting surface 1059 that includes a relief recess 1061 that is recessed from the mounting surface 1059 such that the relief recess 1061 is spaced apart from a mounting surface of a mounting structure when the pipe clamp 1000 is mounted to the mounting structure. The pipe clamp 1000 may be removed from the mounting surface of the mounting structure by a prying tool in a substantially similar manner as the pipe clamp 200 is removed from the mounting surface 270, as described above.

Figure 38:
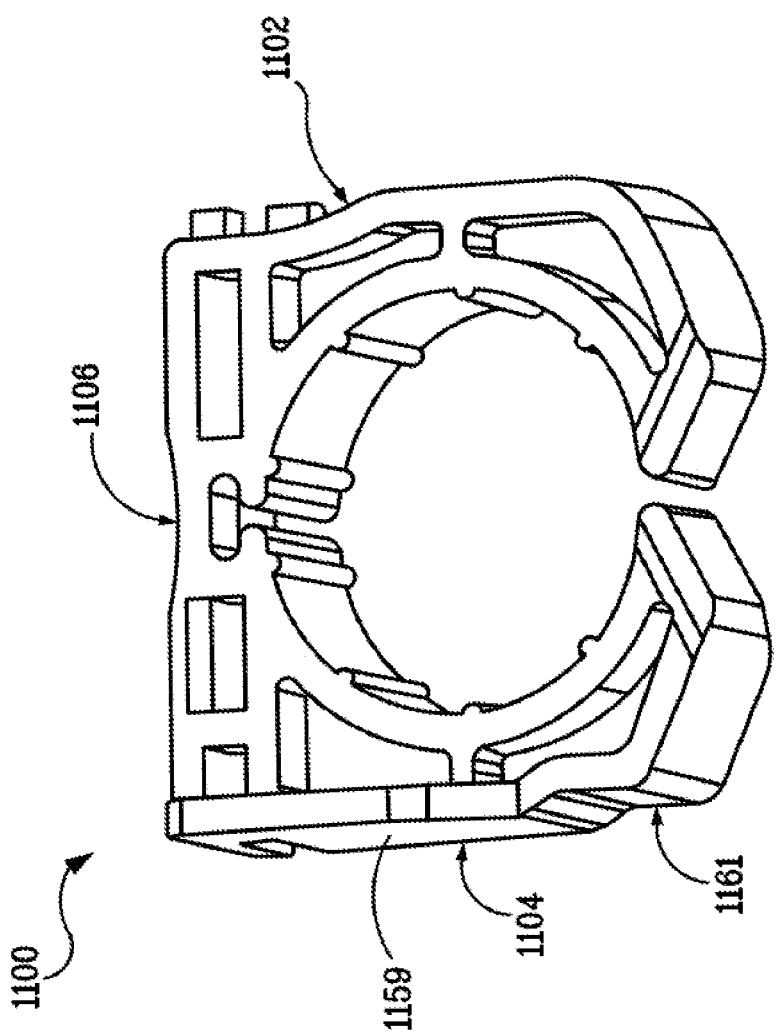
FIGS. 38 and 39 illustrate an eleventh aspect of a pipe clamp, according to aspects of this disclosure.
Figure 39:
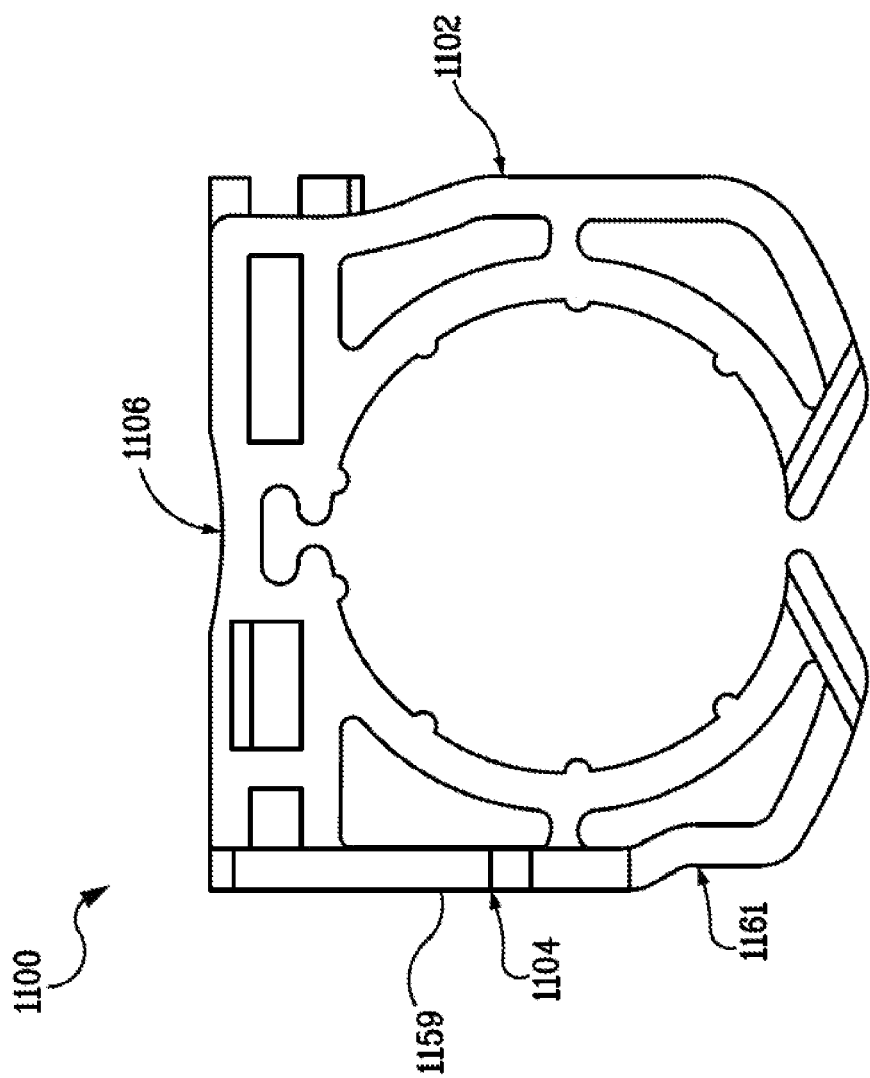

FIGS. 38 and 39 illustrate an alternate aspect of an open loop "C" style full pipe clamp 1100, according to aspects of this disclosure. Portions of the alternate aspect of the pipe clamp 1100 disclosed in FIGS. 38 and 39 are similar to aspects of the open loop "C" style full pipe clamps 200 and 1000 described above in FIGS. 7 through 14 and 36 and 37, and those portions function similarly to those described above. The pipe clamp 1100 includes a first arm 1102, a second arm 1104, and a hinge 1106 positioned between the first arm 1102 and the second arm 1104. The second arm 1104 includes a mounting surface 1159 that includes a relief recess 1161 that is recessed from the mounting surface 1159 such that the relief recess 1161 is spaced apart from a mounting surface of a mounting structure when the pipe clamp 1100 is mounted to the mounting structure. The pipe clamp 1100 may be removed from the mounting surface of the mounting structure by a prying tool in a substantially similar manner as the pipe clamp 200 is removed from the mounting surface 270, as described above.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

What is claimed is:
1. A pipe clamp comprising:
   a first arm having a first mounting end and a first insertion end spaced apart from the first mounting end, the first arm defining a first arcuate recess that extends at least partially between the first mounting end and the first insertion end, the first arm including a first extension element;
   a second arm having a second mounting end and a second insertion end spaced apart from the second mounting end, the second arm defining a second arcuate recess that extends at least partially between the second mounting end and the second insertion end, the second arm including a second extension element;

a hinge positioned between the first arm and the second arm, the hinge being connected to the first mounting end of the first arm and to the second mounting end of the second arm, the first arm being rotatable relative to the second arm about the hinge, wherein the first arcuate recess and the second arcuate recess comprise a pipe recess configured to support a pipe within, and wherein the hinge, the first extension element, and the second extension element define a flex recess therebetween, wherein the first mounting end defines a first mounting channel therethrough and the second mounting end defines a second mounting channel therethrough, wherein the first mounting channel, the second mounting channel, and the flex recess are aligned along an insertion direction and configured to receive a fastener therethrough for mounting the pipe clamp to a mounting surface, the insertion direction extending from the first mounting end to the second mounting end, wherein the first arm has an outer surface that extends from the first mounting end to the first insertion end, wherein the outer surface includes a first curved portion adjacent to the first insertion end, a second curved portion adjacent to the first mounting end, and a flat portion extending between the first insertion end and the first mounting end, and wherein the first arm includes a relief protrusion that extends from the second curved portion of the outer surface.

2. The pipe clamp of claim 1, wherein the first insertion end of the first arm is chamfered, and wherein the second insertion end of the second arm is chamfered.

3. A pipe clamp comprising:

a first arm having a first mounting end and a first insertion end spaced apart from the first mounting end, the first arm defining a first arcuate recess that extends at least partially between the first mounting end and the first insertion end, the first arm including a first extension element;

a second arm having a second mounting end and a second insertion end spaced apart from the second mounting end, the second arm defining a second arcuate recess that extends at least partially between the second mounting end and the second insertion end, the second arm including a second extension element;

a hinge positioned between the first arm and the second arm, the hinge being connected to the first mounting end of the first arm and to the second mounting end of the second arm, the first arm being rotatable relative to the second arm about the hinge, wherein the first arcuate recess and the second arcuate recess comprise a pipe recess configured to support a pipe within, and wherein the hinge, the first extension element, and the second extension element define a flex recess therebetween, wherein the first mounting end defines a first mounting channel therethrough and the second mounting end defines a second mounting channel therethrough, wherein the first mounting channel, the second mounting channel, and the flex recess are aligned along an insertion direction and configured to receive a fastener therethrough for mounting the pipe clamp to a mounting surface, the insertion direction extending from the first mounting end to the second mounting end, wherein the first arm has an outer surface that extends from the first mounting end to the first insertion end, wherein the outer surface includes a first curved portion adjacent to the first insertion end, a second curved portion adjacent to the first mounting end, and a flat portion extending between the first insertion end and the first mounting end, and wherein the first arm includes a relief protrusion that extends from the second curved portion of the outer surface; and wherein the first extension element is spaced apart from the second extension element, and wherein the first extension element and the second extension element further define a portion of the pipe recess.

\* \* \* \* \*